United States Patent
Facchinello et al.

(10) Patent No.: US 11,602,981 B2
(45) Date of Patent: Mar. 14, 2023

(54) TONNEAU COVER ASSEMBLY WITH A FLUID MANAGEMENT SYSTEM

(71) Applicant: Tectum Holdings Inc., Ann Arbor, MI (US)

(72) Inventors: Jerome Facchinello, Grand Blanc, MI (US); Daniel J. Delaney, Pinckney, MI (US); Robert L. Mosingo, Saline, MI (US); Robert Gaarder, West Bloomfield, MI (US); Chad Carter, Manchester, MI (US); David Germano, Ann Arbor, MI (US)

(73) Assignee: EXTANG CORPORATION, Ann Arbor, MI (US)

( * ) Notice: Subject to any disclaimer, the term of this patent is extended or adjusted under 35 U.S.C. 154(b) by 0 days.

(21) Appl. No.: 17/397,081

(22) Filed: Aug. 9, 2021

(65) Prior Publication Data

US 2021/0362575 A1 Nov. 25, 2021

Related U.S. Application Data

(63) Continuation of application No. 17/099,947, filed on Nov. 17, 2020, which is a continuation of application No. 16/296,578, filed on Mar. 8, 2019, now Pat. No. 10,875,391.

(60) Provisional application No. 62/640,799, filed on Mar. 9, 2018.

(51) Int. Cl.
*B60J 7/14* (2006.01)
*B60J 7/00* (2006.01)
*B60J 10/90* (2016.01)
*B60P 7/04* (2006.01)

(52) U.S. Cl.
CPC ............. *B60J 7/141* (2013.01); *B60J 7/0084* (2013.01); *B60J 10/90* (2016.02); *B60P 7/04* (2013.01)

(58) Field of Classification Search
CPC . B60J 7/0084; B60J 7/041; B60J 7/061; B60J 7/062; B60J 7/068; B60J 7/08; B60J 7/102; B60J 7/106; B60J 7/141; B60J 7/1607; B60J 10/90; B60P 7/04
USPC ............. 296/100.02, 100.06, 100.09, 100.17
See application file for complete search history.

(56) References Cited

U.S. PATENT DOCUMENTS

| | | | |
|---|---|---|---|
| 4,036,521 A | 7/1977 | Clenet | |
| 4,707,016 A | 11/1987 | McDonald | |
| 4,730,866 A * | 3/1988 | Nett | B60J 7/104 296/100.18 |
| 4,776,629 A | 10/1988 | Cross | |
| 4,807,921 A | 2/1989 | Champie, III et al. | |
| 5,971,469 A | 10/1999 | Lund et al. | |
| 6,126,226 A | 10/2000 | Wheatley | |
| 6,702,359 B2 | 3/2004 | Armstrong et al. | |
| 6,712,418 B1 | 3/2004 | Lathers | |
| 6,890,022 B2 | 5/2005 | Doncov et al. | |
| 7,093,881 B2 | 8/2006 | Rusu | |

(Continued)

OTHER PUBLICATIONS

Non-Final Office Action dated Sep. 21, 2022, for U.S. Appl. No. 17/476,589.

*Primary Examiner* — Jason S Daniels
(74) *Attorney, Agent, or Firm* — The Dobrusin Law Firm, P.C.

(57) ABSTRACT

A bed cap configured for attachment to a tailgate of a vehicle, the bed cap includes a channel configured to collect fluid and/or debris, the channel comprising a first opening for evacuating the fluid and/or debris from within the channel.

23 Claims, 17 Drawing Sheets

(56) References Cited

U.S. PATENT DOCUMENTS

| | | |
|---|---|---|
| 7,484,788 B2 | 2/2009 | Calder et al. |
| 7,537,264 B2 | 5/2009 | Maimin et al. |
| 7,607,714 B2 | 10/2009 | Wheatley |
| 8,672,388 B2 | 3/2014 | Rusher et al. |
| 10,173,506 B2 | 1/2019 | Nania |
| 2018/0043759 A1 | 2/2018 | Rohr et al. |
| 2018/0134132 A1 | 5/2018 | Nania |

* cited by examiner

TONNEAU COVER ASSEMBLY WITH A FLUID MANAGEMENT SYSTEM

PRIORITY

This application is a continuation of U.S. Ser. No. 17/099,947 filed on Nov. 17, 2020, which is a continuation of U.S. Ser. No. 16/296,578 filed on Mar. 8, 2019, which claims the benefit of U.S. provisional application No. 62/640,799 filed on Mar. 9, 2018.

FIELD

These teachings relate to a tonneau cover assembly, and more specifically a bed cap assembly that assists in managing fluid and/or debris.

BACKGROUND

Some vehicles, like pick-up trucks, have an open-topped bed or cargo area that may be used for storing or transporting cargo. A cover, such as a tonneau cover, may be placed over the cargo area to conceal the cargo from view and/or to prevent fluid and/or debris from entering the cargo area.

However, some tonneau covers still allow fluid and/or debris to enter the cargo area, which may cause the inside of the cargo area to become wet and/or damage cargo therein. For example, fluid and/or debris may enter, leak, or seep into the cargo area through gaps defined between the tonneau cover and the bed caps and/or walls defining the cargo area.

While some systems have been previously proposed to manage fluid and/or debris, it may be desirable to have an improved tonneau cover assembly with a fluid management system for reducing or preventing fluid and/or debris from entering the cargo area.

SUMMARY

These teachings provide a tonneau cover assembly. These teachings provide a fluid management system for reducing or preventing fluid and/or debris from entering the cargo area of a vehicle.

The tonneau cover assembly according to these teachings comprises a bed cap. A bed cap is a member or cover that is located on a wall defining the cargo area. The bed cap comprises a fluid management system that includes a channel. The channel may be at least partially covered by, or located underneath, a portion of the tonneau cover when at least a portion of the tonneau cover is in a closed position. In the closed position, at least a portion of the tonneau cover at least partially covers, or preferably fully covers, the open topped cargo area.

The bed cap may also provide a contact surface for the tonneau cover to rest on when at least a portion of the tonneau cover is in a closed position. The location or position of the contact surface on the bed cap may be configured to provide for an upper surface of the tonneau cover to be generally flush with an upper surface of the bed cap when the tonneau cover is in a closed position, which may advantageously improve aesthetics of the tonneau cover assembly by providing a smooth or uniform look between the tonneau cover and the bed cap. The location or position of the contact surface on the bed cap may also provide for an upper surface of the tonneau cover to be generally over-flush, or sub-flush with an upper surface of the bed cap when the tonneau cover is in a closed position.

A bed cap assembly for use with a tonneau cover and a vehicle comprising a cargo area, the bed cap assembly is configured to be located on a bed wall defining the cargo area, the bed cap assembly comprising a channel configured to collect fluid and/or debris, the channel comprising an opening for draining the fluid and/or debris from the channel into a top surface of the bed wall.

The channel comprises a floor, the opening is a floor opening defined in the floor. The channel comprises a first wall and a floor, the opening is a wall opening defined in the first wall. There may also be a second opening defined in the floor. The wall opening and the floor opening are connected together to form a single opening. The opening is located in two different planes. The top surface of the bed wall comprises a stake hole, the fluid and/or debris are drained into the stake hole. The bed cap assembly comprises a seal, and the channel is defined by a floor, a first wall, and a second wall, the second wall is a wall of the seal. The bed cap assembly comprises a ledge, the seal is disposed on the ledge. The seal is disposed on a bottom surface of the tonneau cover. The channel extends between a first end and a second end, the first end comprises an open end for draining the fluids and/or debris from the channel. The bed cap assembly comprises a support section for a portion of the tonneau cover to contact when the tonneau cover is in a closed position, the support section is lower than the channel relative to a floor of the cargo area. However, in some configurations, the support section may be at the same level as the channel or higher than the channel relative to the floor of the cargo area. The support section comprises a second channel configured to collect fluid and/or debris.

A bed cap assembly comprising a bed cap and a fluid management system. The bed cap is configured to connect to a bed wall of a cargo area of a vehicle. The fluid management system includes a channel collecting fluid and/or debris, the channel comprising a floor and a first wall; and a wall opening in the first wall of the channel to drain the fluid and/or debris collected inside the channel to a location external of the cargo area. The floor comprises a floor opening to drain the fluid and/or debris from the channel. The wall opening and the floor opening are connected together to form a single opening. The fluid management system comprises a second opening that is located in a different plane than the wall opening. The fluid management system comprises a duct that is in communication with the wall opening, the duct guides the fluid and/or debris into a stake hole defined in a top surface of the bed wall. The channel has a rearward-most end that is located adjacent a tailgate of the cargo area, a wall is located at the rearward-most end that blocks the fluid and/or debris from draining out of the channel via the rearward-most end. The channel has a rearward-most end that is located adjacent a tailgate of the cargo area, the rearward-most end comprises an opening for draining the fluid and/or debris from the channel.

DETAILED DESCRIPTION

Figure 1:
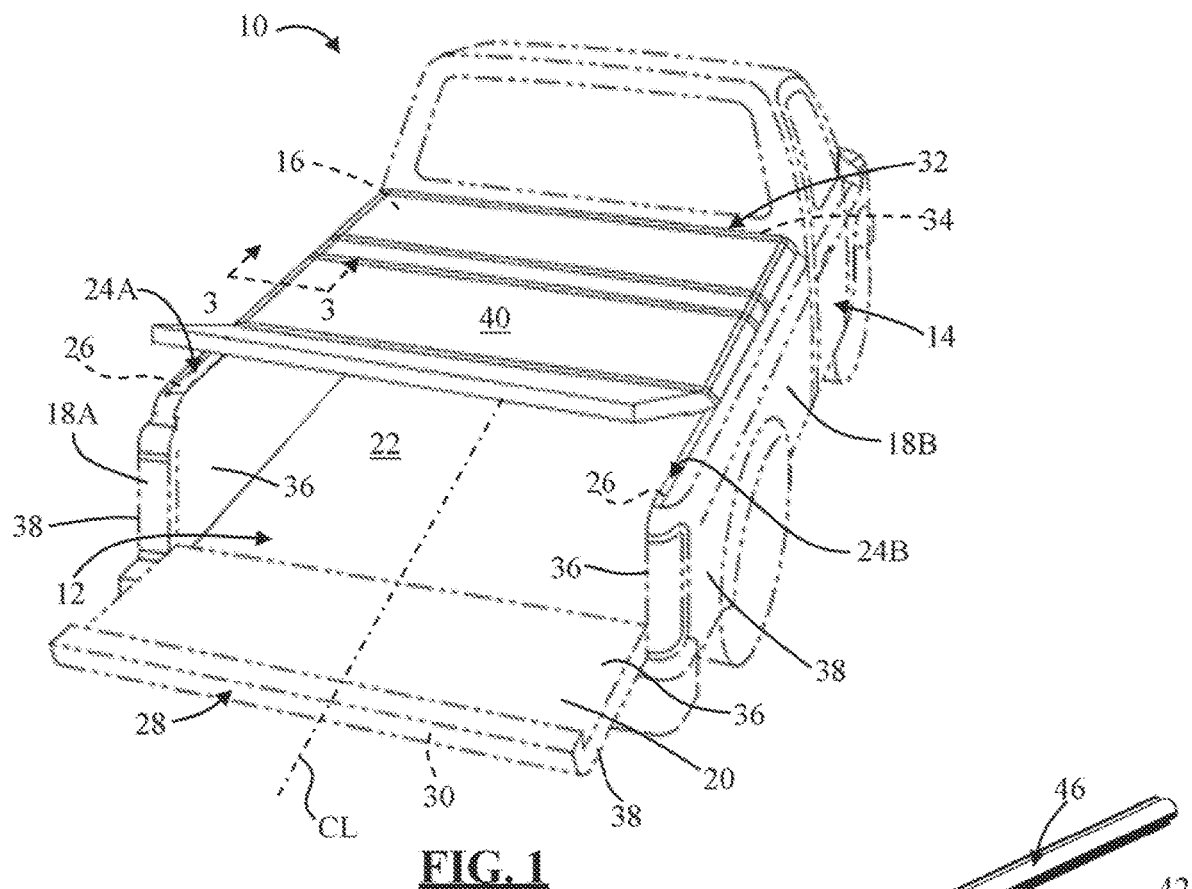
FIG. 1 is a perspective view of a vehicle that includes a cargo area.

The vehicle may be any vehicle that has a cargo area. The cargo area may be any area of the vehicle used for storing or transporting cargo. The cargo area may be a cargo box, a bed, a trunk, or a combination thereof. The cargo area may be part of a trailer that is configured to be pulled or pushed by a vehicle. The cargo area may have an open top. The cargo area may be any part of the vehicle or trailer that has an open top that is at least partially closed or covered by a cover, which may be a trunk, decklid, tonneau cover, cap, tent, tarp, board, or a combination thereof.

The tonneau cover, which may also be referred to herein as a cover, may be any suitable cover that functions to protect against dirt, debris, fluid, and/or other contaminants from entering an inside of a cargo area. The tonneau cover may function to conceal the inside of the cargo area and/or contents inside the cargo area.

The tonneau cover may comprise one or multiple panels. The one or more of the panels can be moved or repositioned relative to one another and/or relative to the cargo area to move the tonneau cover between an open position and a closed position. The one or more panels may be rigid and configured to be roll-up into a closed position. One or more of the panels may be substantially rigid. One or more of the panels may be substantially flexible, but stabilized with a rigid frame. In some configurations, the tonneau cover may be a single panel cover. The single panel can be raised or pivoted relative to the walls or top surfaces of the cargo area and/or tailgate to reposition the tonneau cover between an open position and a closed position. The tonneau cover may be a canvas, fabric, a folded, or roll-up type tonneau cover. The tonneau cover may also be a truck cap or tent that functions to increase a height of a cargo area.

A closed position as used herein means that the tonneau cover at least partially covers the open top or end of the cargo area. The closed position may also mean that at least a section of the tonneau cover is in an open position. For example, closed position may mean that one or more of the panels or sections of the tonneau cover may be rolled or folded into the open position while one or more panels or sections remain rolled or folded in the closed position.

The tonneau cover assembly comprises one or more bed cap assemblies. A bed cap assembly may function protect, cover, and/or close out one or more walls defining the cargo area. A bed cap assembly may cover or protect a top surface of a bed wall defining the cargo area. A bed cap assembly may cover or protect an outside wall and/or an inside wall of a wall defining the cargo area.

Several bed caps and bed cap assemblies are disclosed herein. It is understood that one or more elements from the several bed cap assemblies can be omitted, combined, and/or duplicated to form one or more bed cap assemblies. For example, one or more elements from the bed cap assembly of FIGS. 2, 3A-8B may be combined with each other, with the bed cap assembly of FIGS. 10-11, FIGS. 12-13, FIGS. 14-15, 19-21, or any combination thereof. It is also understood that elements of any of the support members disclosed herein, including those in FIGS. 2, 3A-3B, 4-8B, 12-13, 17-18, 21 may be combined with each other and/or integrated into one or more of the bed cap assemblies disclosed herein. Moreover, while some bed cap assemblies were described herein as being provided on a side wall or tailgate or front wall defining the cargo area, those bed cap assemblies, or their elements, may find use on other walls defining the cargo area. For example, while the bed cap assembly 28 of FIGS. 10 and 11 was described as being provided on the top wall of the tailgate, that bed cap assembly 28, or one or more elements of the bed cap assembly 28 may find use on the bed cap assembly 24A for use with a side wall of the cargo area, and so on.

The bed cap assembly may function to provide a support structure or surface for the tonneau cover to rest or contact when the tonneau cover is in the closed position. By providing a support or surface on the bed cap assembly for the tonneau cover to rest on when the tonneau cover is in the closed position, as opposed to attaching support rails or other structures to the inside walls defining the cargo area, as may be the case in some known tonneau cover systems, space inside of the cargo area may be freed up or gained. Moreover, by integrating or providing a support or surface on the bed cap assembly for the tonneau cover to rest on when the tonneau cover is in the closed position, less components need to be attached to the cargo area, which means installation of the tonneau cover system may be faster and less labor intensive. The bed cap assembly may be made of a suitable material such as plastic. However, some components of the bed cap assembly, such as a support member, may be made of metal.

The bed cap assembly may be in contact with, secured, or attached to a top surface of one or more walls defining the cargo area. The bed cap assembly may be in contact with, secured, or attached to an inside surface of one or more inside walls defining the cargo area—the inside surface being a surface of one or more of the walls that face the inside of the cargo area. The bed cap assembly may be in contact with, secured, or attached to an outside surface of one or more walls defining the cargo area. The bed cap assembly may be attached to the one or more walls via one or more fasteners, like push pins, Christmas trees, welds, sonic welds, clips, or a combination thereof. In some configurations, the bed cap assembly may be attached to one or more walls defining the cargo area with an adhesive, like double sided tape or glue. The bed cap assembly may be attached to any wall of a cargo area. The bed cap assembly may be attached to or provided over an existing or OEM bed cap. The bed cap assembly may be attached to the support member, and the support member is then attached to the top surface of the bed wall, the inside surface of the bed wall, the outside surface of the bed wall, or a combination thereof.

In some configurations, an OEM bed cap may be removed or separated from the wall defining the cargo box, and one or more bed cap assemblies according to these teachings may be installed in its place. This method of replacing the bed cap assembly may include one or more steps that may be performed in any order, including: removing or separating any existing bed cap assemblies from the walls defining the cargo bed; aligning one or more fasteners or positioning members on the bed cap assembly with one or more apertures defined in the top surface of the bed wall; aligning one or more downspouts of tubes with one or more apertures defined in the top surface of the bed wall; and then applying a force onto the top surface of the bed cap assembly for the fasteners to engage the corresponding openings in the bed wall. One or more adhesives, like tape or glue may also be used to secure the bed cap assembly to the wall defining the cargo area. In other configurations that do not include apertures or mounting locations in the top surface of the bed wall, adhesives, like tape or glue, may be used to secure the bed cap assembly to the wall of the cargo bed and one or more tube or drains, if applicable, may be routed into one or more apertures defined in the bed wall.

One or more of the bed cap assemblies may also function to straighten out the walls defining the cargo area. Stated another way, the walls of some cargo area, in certain configurations, narrow or taper towards the center line of the cargo area when extending from the front to the back towards the tailgate. The bed cap assemblies located on the side walls of the cargo bed may be configured to straighten the walls to be generally parallel to each other so that a tonneau cover can be fit between the bed cap assemblies. In other configurations, the bed cap assemblies may function to add a taper or narrow the opening of the cargo box so that a tapered or narrowed tonneau cover can be assembled onto the vehicle. In other configurations, the top surfaces of the walls of the cargo area may have higher or lower portions in an up/down direction relative to the floor of the cargo area. The top surfaces of the bed cap assemblies may function to make the bed walls generally straight or parallel to the floor of the cargo area for example. In other configurations, the top surfaces of the bed cap assemblies may function to add a sloped or tapered look to the cargo area.

The bed cap assembly comprises a fluid management system. The fluid management system may function to reduce or prevent fluid and/or other debris from entering the cargo area of the vehicle. The fluid management system may function to maintain fluid and/or other debris inside of a confined area in the bed cap assembly. The fluid management system may function to evacuate and/or drain fluid and/or other debris to a location outside of the cargo area and/or vehicle. The fluid management system may be contained in the bed cap or bed cap assembly. In some configurations, the tonneau cover may form part of the fluid management system. The fluid management system comprises one or more channels, one or more openings (wall openings and/or floor openings), one or more downspouts, one or more tubes or drains, other openings or apertures, or a combination thereof.

The fluid management system may comprise one or more channels. A channel may function to direct, guide, or provide a path for fluid and/or debris to be directed to one or more downspouts or openings for evacuation from the channel and away from the inside of the cargo area and vehicle.

The channel may be a channel, groove, aqueduct, or notch defined in a bed cap, support member, or both. The channel may have a C- or U- or V-shaped cross section. The channel may also have a W-shaped cross section, where a wall is provided in the middle of the inboard and outboard channel walls defining the channel. The channel may also have an L-shaped cross section (i.e., FIGS. 3H and I). The channel may be defined by one or more walls and a floor. The one or more walls may be planar, curved, sloped, angled, or a combination thereof relative to each other and/or to the floor, which may also be planar, curved, sloped, angled, or a combination thereof relative to the one or more walls. A side wall of one or more seals or the tonneau cover, such as a rigid frame of the tonneau cover, or the bottom surface of the tonneau cover may also define some or all of the channel. The floor may be angled or sloped towards one or both walls to assist in draining the fluid and/or debris towards the wall(s). For example, the floor may be crowned in a central portion and then divert or slope towards each of the walls.

This may be advantageous in preventing fluid and/or debris from collecting or accumulating in a center portion of the channel.

In some configurations, the channel may be free of a floor, and instead is defined by one or more walls (i.e., inboard and/or outboard channel walls). The fluid and/or debris may be drained through the bottom or floor-less area of the channel, which is where the floor is located in other configurations described herein.

The channel may be a single continuous channel, groove, or aqueduct that extends along an entire length of the bed cap, or one or more segments that extend along only certain portions thereof. In some configurations, the fluid management system may comprise two or more channels that are arranged side-by side in a fore-after direction on the same plane or in different planes. One or more channels may also be defined on the top surface of the bed cap that is always exposed from above the bed cap, even when the tonneau cover is in a closed position.

The floor of the channel may be sloped towards a front end of the cargo area, a rear end of the cargo area, towards one or more downspouts or openings in the channel, or a combination thereof. The floor of the channel may have one or more sections that are sloped in different directions. For example, between a forward end and a midpoint of the bed cap, the channel may be sloped towards the forward end of the bed cap towards an opening, open end, or one or more downspouts. Between a rearward end and a midpoint of the bed cap, the channel may be sloped towards the rearward end of the channel towards an opening, open end, or one or more downspouts. The top or open end of the downspout may be open or exposed to the atmosphere. Alternatively, the top or open end of the downspout may be covered or protected by covering to prevent larger debris and/or elements from entering and/or getting stuck inside of the channel, such as rocks, ice, snow, etc. The covering may be a porous material, such as a foam, screen, and the like to allow for fluid to enter the channel.

The fluid management system may comprise one or more downspouts. A downspout may function to evacuate, drain, and/or remove contents from inside of the channel (i.e., fluid, debris, etc.). A downspout may be a tube, hose, duct or other passageway that is rigid or flexible that is configured to guide the fluid and/or debris from inside the channel to a location that is external to the cargo box, such as between the inner and outer walls defining the bed walls. For example, the downspout or duct may fit inside one or more of the openings or stake holes defined in the top surface or inside wall or surface of the walls defining the cargo area. The duct may guide or channel the fluid and/or debris into an open space or cavity defined between the inner and outer walls or surfaces of the walls defining the cargo area. The duct may extend from a bottom or B-side of the bed cap. A duct may be a rigid tube. A duct may be a flexible and/or resilient member or hose so that the fluid and/or debris can be guided into one or more holes in the walls of the cargo area.

The downspout or duct may have any cross section, such as a circular, oval, square, or rectangular cross section. Preferably, a cross section of the downspout or duct is the same as a cross section or shape of an opening defined in the wall of the cargo area into which the downspout or duct is configured to fit. The downspout or duct may be configured to be received into a stake hole defined in a top surface of the wall or bed wall defining the cargo area. The stake hole may have a square or rectangular shape or cross section and preferably so does the downspout or duct. A size of the downspout may be configured to be only slightly smaller than the opening in the wall of the cargo area into which it is received. This may allow for the opening to still be used for other purposes, such as attaching a ladder rack or other component or accessory to the vehicle or the cargo area via the one or more stake holes.

The fluid management system may comprise any number of downspouts, including one or more downspouts, two or more downspouts, three or more, four or more, or even five or more downspouts. In some configurations, the bed cap may comprise zero downspouts. Instead the channel may have one or both of the openings at the end of the channel open or available to drain fluid and/or debris from the channel. The number of downspouts may depend on the length or size of the cargo area and/or the number and size of apertures or stake holes defined in the top surface of the wall that the bed cap is attached to.

An opening may be defined in one or more of the walls defining the channel and/or in the floor defining the channel. The openings may have any suitable shape and size for evacuating the fluid and/or debris from the channel. The number, shape, and size of the openings may depend on the number of downspouts and/or the number and size of the apertures in the walls defining the cargo area into which the fluid and/or debris can be drained. The one or more openings may be connected together, such as the ones illustrated in FIGS. 7-8 where the opening is defined in two separate planes. In certain configurations, connected openings may be defined in only one plane (i.e., side by side openings in only in a wall or floor), in two planes (connected openings in a wall and floor), or in three planes (connected in both walls and also the floor).

One or more openings may be also be provided in the floor. The opening may be such that the entire floor is an opening; thus, the channel may be without a floor. The fluid and/or debris may be drained or evacuated from the channel through the "floor-less" portion of the channel and/or one or more wall openings in the inboard and/or outboard walls and/or at the rearward or forward-most ends of the channel. The opening may also be a groove or cutout in the floor that extends entirely along a length of the floor through which the fluid and/or debris may be drained therefrom. The one or more walls defining the channel may be sloped towards the floor or groove or cutout in the floor for assisting in directing the fluid and/or debris into the opening for evacuation to an external portion of the cargo bed.

The bed cap assembly may include one or more seals. The one or more seals may function to block, restrict, or prevent fluid and/or debris from entering the cargo area via one or more gaps or openings. The one or more seals may be located anywhere on the bed cap and/or tonneau cover to block, restrict, or prevent fluid and/or debris from entering the cargo area. The bed cap may include any number of seals. The one or more seals may close out one or more gaps, passages, spaces, and/or openings defined between the bed cap and sheet metal of the vehicle, between the bed cap and the tonneau cover, or a combination thereof. The seal may extend along an entire length of the bed cap assembly, or only along selected portions thereof where gaps are formed, where gaps are prone to form over time, or both. The seal may be located on a top or A-surface of the bed cap, the upper portion, the lower portion, a bottom or B-surface, or a combination thereof.

The seal may be integrally formed (i.e., multi-shot injection molded, for example) with the bed cap. The seal may be an extruded component that is attached to the bed cap assembly as a secondary process with a fastener like glue, melting, or staking. The seal may be installed or snapped into a channel or slot defined in the bed cap assembly, the upper portion, or the lower portion.

The seal may have a suitable shape or cross section. The seal may have a circular cross section, a D-shaped cross section, an oval-shape cross section. The seal may have one or more whiskers or fingers that extend from the seal. The seal may be made of a suitable material, such as: a rubber, PVC, EPDM, Silicone, foam, or a combination thereof.

The bed cap assembly may include one or more support members. A support member may function to add rigidity or stability to the bed cap assembly and/or tonneau cover system. A support member may function to provide support under the bed cap assembly so that a weight of the tonneau cover resting on the bed cap assembly can be supported and maintained. The support member may function to eliminate the need to install ancillary or auxiliary bed rails to the inside surfaces of the cargo area, which may advantageously increase the amount of room inside of the cargo area. A support member may be made of metal, plastic, or both. A support member may be sandwiched between the bed cap and the top surface of the wall defining the cargo area. A support member may comprise a contact surface for a portion of the tonneau cover, like the frame or other structural portion of the tonneau cover to contact when the tonneau cover is in a closed position.

A bed cap assembly for a pickup truck comprising a cargo area, the bed cap assembly is configured to be located to a top surface of a wall defining the cargo area, the bed cap assembly comprising: a bed cap comprising: a channel that is configured to collect fluid and/or debris, and a top surface that is located outboard of the channel. The top surface of the bed cap is generally flush with a top surface of a tonneau cover when at least a portion of the tonneau cover is in a closed position. The bed cap assembly comprises a contact surface that the tonneau cover contacts when the tonneau cover is in a closed position, the contact surface is inboard of the channel relative to an inside of the cargo area. The bed cap assembly is located on a top surface of a tailgate. The channel is located above the top surface of the tailgate. The bed cap assembly is located on a top surface of a side wall defining the cargo area. The channel is located above the top surface of the side wall. The bed cap assembly comprises a second contact surface for the tonneau cover to contact when the tonneau cover is in the closed position, the second contact surface is located inboard of the first contact surface relative to an inside of the cargo area. The second contact surface is vertically lower than the first contact surface. The second contact surface comprises a channel that collects fluid and/or debris. The channel has a rearward-most end that is located adjacent a tailgate of the cargo area, a wall is located at the rearward-most end that blocks the fluid and/or debris from draining out of the channel via the rearward-most end. The channel has a forward-most end located adjacent a cab of the vehicle, a wall is located at the forward-most end that blocks the fluid and/or debris from draining out of the channel at the forward-most end. The channel extends between a first end and an opposing second end, the first end is open so that the fluid and/or debris can drain out of the first end of the channel. The second end is open so that the fluid and/or debris can drain out of the second end of the channel. The channel comprises at least one opening that is located in two different planes for draining the fluid and/or debris from the channel. The channel comprises a floor, the floor comprises a floor opening that drains the fluid and/or debris from inside the channel. The channel comprises a first wall and a floor, the first wall comprises an opening that is configured to drain the fluid and/or debris from inside the channel. The floor comprises a floor opening that drains the fluid and/or debris from inside the channel. The wall opening and the floor opening are connected together to form a single opening.

A bed wall of a cargo area of a pickup truck, the bed wall comprising: an outboard wall, an inboard wall, a top surface extending between the outboard wall and the inboard wall, a channel extending from the inboard wall, the channel is configured to collect fluid and/or debris, and a contact surface extending from the channel that is configured to support a tonneau cover when at least a portion of the tonneau cover is in a closed position. The contact surface is located vertically higher than a floor of the channel relative to floor of the cargo area. The contact surface is located vertically lower than the stop surface of the bed wall relative to floor of the cargo area. A gap is defined between an edge of the tonneau cover and the inboard wall when at least the portion of the tonneau cover is in the closed position. the bed wall is a tailgate of the cargo area. The bed wall is a side wall of the cargo area. A bed cap is configured to be located on the top surface of the bed wall, a top surface of the tonneau cover is generally flush with a top surface of the bed cap when the tonneau cover is in the closed position.

FIG. 1 illustrates a vehicle 10. The vehicle 10 includes a cargo area 12 and a passenger area or cab 14. The vehicle 10 and/or cargo area 12 may extend along a longitudinal axis or centerline CL.

The cargo area 12 is defined by one or more walls. The one or more walls may include a wall 16 (or "front wall") that is located adjacent the cab 14; opposing walls 18A, 18B (or "side walls" or "bed walls" and/or "driver's side bed wall" and "passenger side bed wall", respectively); and a wall 20 (or "backwall" or "tailgate") that opposes the front wall 16. The cargo area 12 has a bottom or floor 22. The cargo area 12 has an open top that can be covered with a cover, like a tonneau cover 40.

Figure 9:
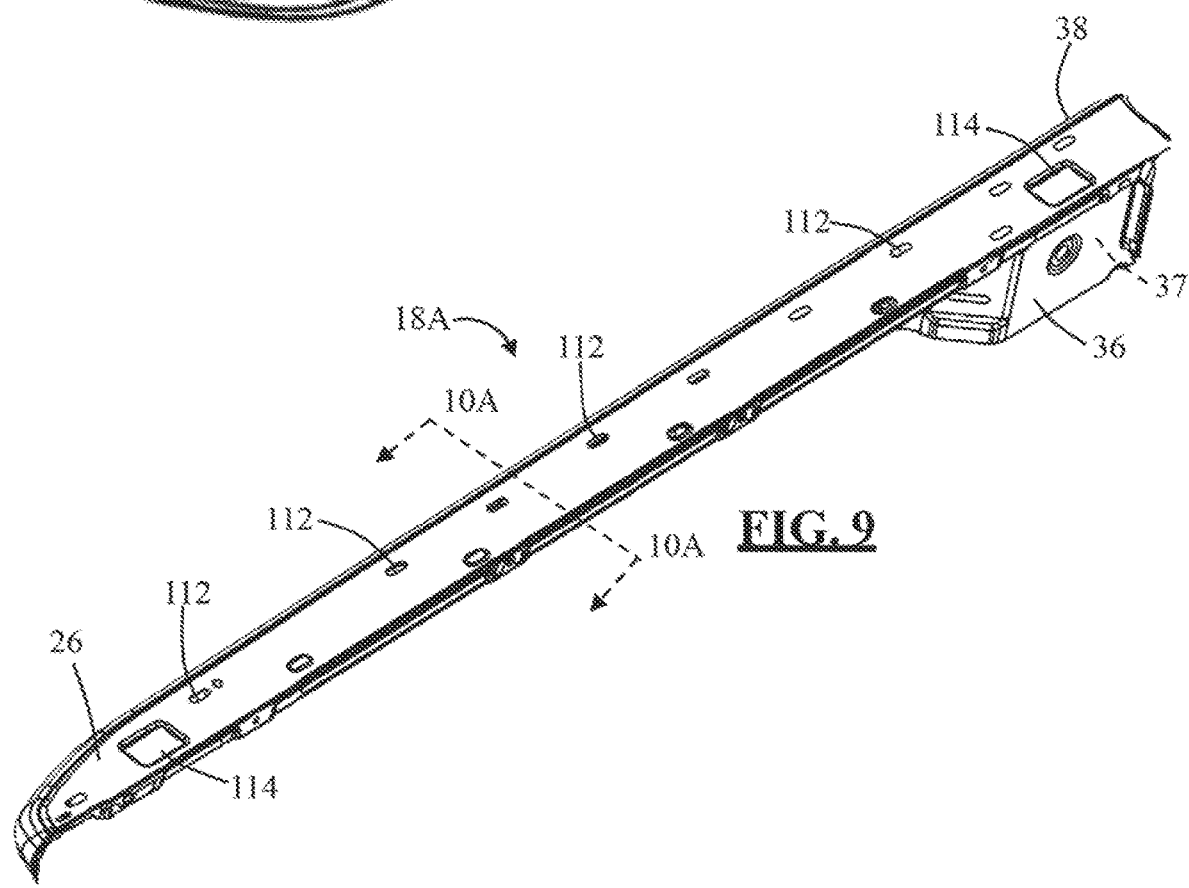
FIG. 9 is a perspective view of a portion of a bed wall defining the cargo area in FIG. 1.

A bed cap assembly 24A, 24B is located on or attached to a top surface 26 of a respective bed wall 18A, 18B. FIG. 9 illustrates an example of a bed wall 18A having a top surface 26. A bed cap assembly 28 is located on or attached to a top surface 30 of the tailgate 20. A bed cap assembly 32 is located on or attached to a top surface 34 of the front wall 16.

One or more of the bed walls 16, 18A, 18B, 20 comprise an inner wall 36, an opposing outer wall 38, and an open space or cavity defined in between the two walls 36, 38. The inner wall 36 as used herein faces an inside of the cargo area 12 or the center line CL, and an outer wall 38 faces outwardly or opposite the inside of the cargo area 12.

A cover or tonneau cover 40 is configured to close or cover the open top of the cargo area 12. The tonneau cover 40 may conceal the inside of the cargo area 12 and/or protect against dirt, debris, fluid, and/or other contaminants from entering the cargo area 12. In the closed position, at least a portion of the tonneau cover 40 is configured to contact or rest on at least a portion of one or more of the bed cap assemblies 24A, 24B, 28, 32.

Figure 2:
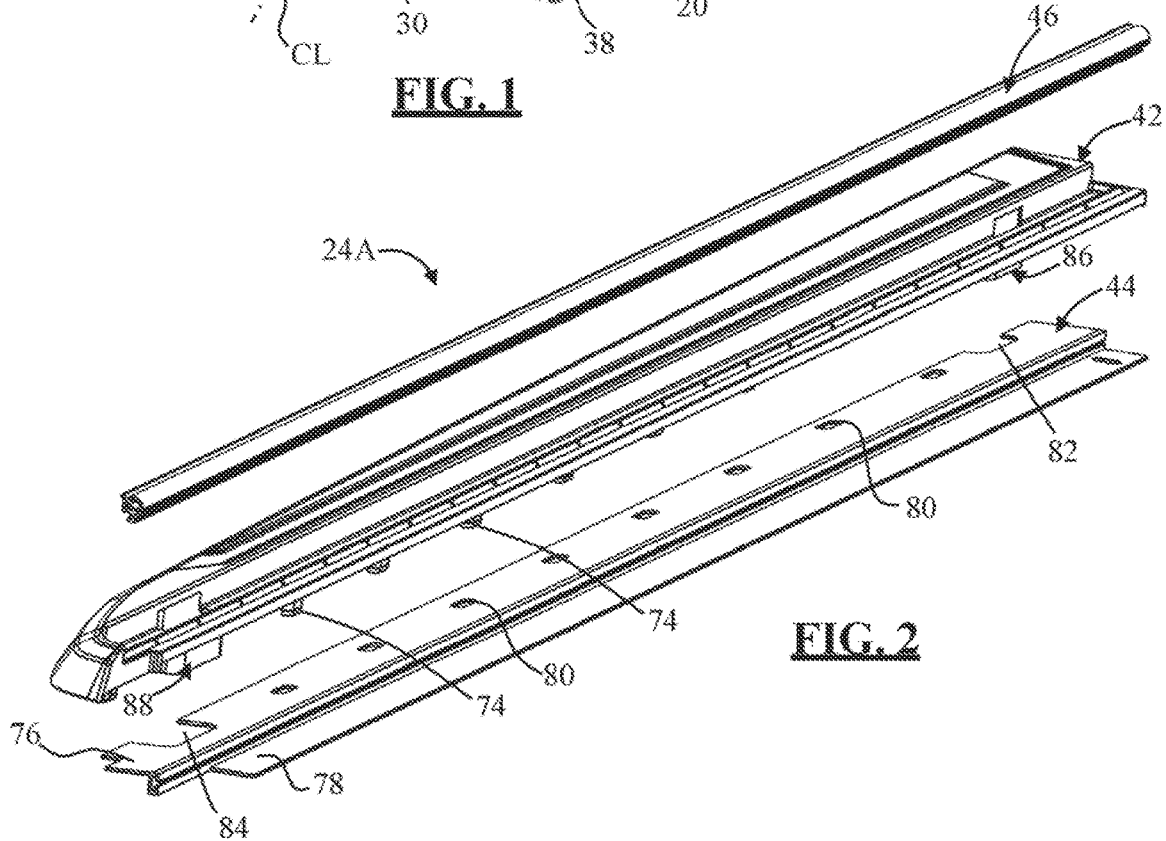
FIG. 2 is an exploded view of a bed cap assembly.

FIG. 2 illustrates the bed cap assembly 24A. The bed cap assembly 24B may be a mirror image of the bed cap assembly 24A and may include some or all of the elements of the bed cap assembly 24A. Alternatively, the bed cap assembly 24B may not be a mirror image of bed cap assembly 24A, but may still include one or more, or all of the elements of the bed cap assembly 24A.

The bed cap assembly 24A comprises a bed cap 42, a support member 44, and a seal 46. In some configurations, the support member 44 may be omitted. In some configurations, one or more elements of the support member 44 may be added to or incorporated into the bed cap 42—i.e., formed as a single, integral component with the bed cap 42 or attached to the bed cap 42 with fasteners. In some configurations, the seal 46 may be omitted or incorporated into the tonneau cover 40.

The bed cap 42 comprises one or more fasteners 74 that are configured to engage openings, attachment points or members, or apertures 112 defined in the top surface of the bed wall 18A (FIG. 9). One or more fasteners may also engage an inside wall 36 of the bed wall (i.e., inside wall faces inside of the cargo area 12; FIG. 1) or outside wall 36 of the bed wall to attach the bed cap 42 to the bed wall. One or more of the fasteners may be formed or molded with the bed cap 42 and/or one or more of the fasteners may be attached to the bottom of the bed cap 42, for example, to a dog house on the bottom of the bed cap 42. In addition to fasteners 74, or in lieu of fasteners 74, the bed cap 42 may be attached to the bed wall 18A and/or to support member 44 with tape, glue, or other adhesives.

The support member 44 may be configured to provide support and/or add rigidity to the bed cap 42 or reinforce certain areas of the bed cap 42, as will be described below. The support member 44 may be configured to provide a contact surface for the tonneau cover 40 to contact or rest on when at least a portion of the tonneau cover is in a closed position. The support member 44 may also be referred to herein and/or in the art as a rail or bed rail. The support member 44 may be attached to a top, inside, or outside wall of the bed wall with one or more fasteners and/or tape or other adhesives. The support member 44 may be fastened to the bed wall and also engage or capture one or more features of the bed cap 42 (i.e., like fastener 74, downspouts 86, 88, ribs, etc to attach the bed cap 42 to the bed wall. The support member 44 comprises a first support section 76 and a second support section 78.

The first support section 76 comprises a plurality of apertures 80 through which the fasteners 74 from the bed cap 42 are configured to extend when attaching to the bed wall 18A. Accordingly, the first support section 76 gets sandwiched between the top surface 26 of the bed wall 18A and the bottom surface of the bed cap 42 after the bed cap assembly 24A is installed on the wall 18A. In some configurations, fasteners that are not part of the bed cap 42 may extend through some or all of the apertures 80 in the first support section 76 to connect or attach the support member 44 to the top surface 26 of the bed wall 18A (See also FIG. 9).

Figure 6:
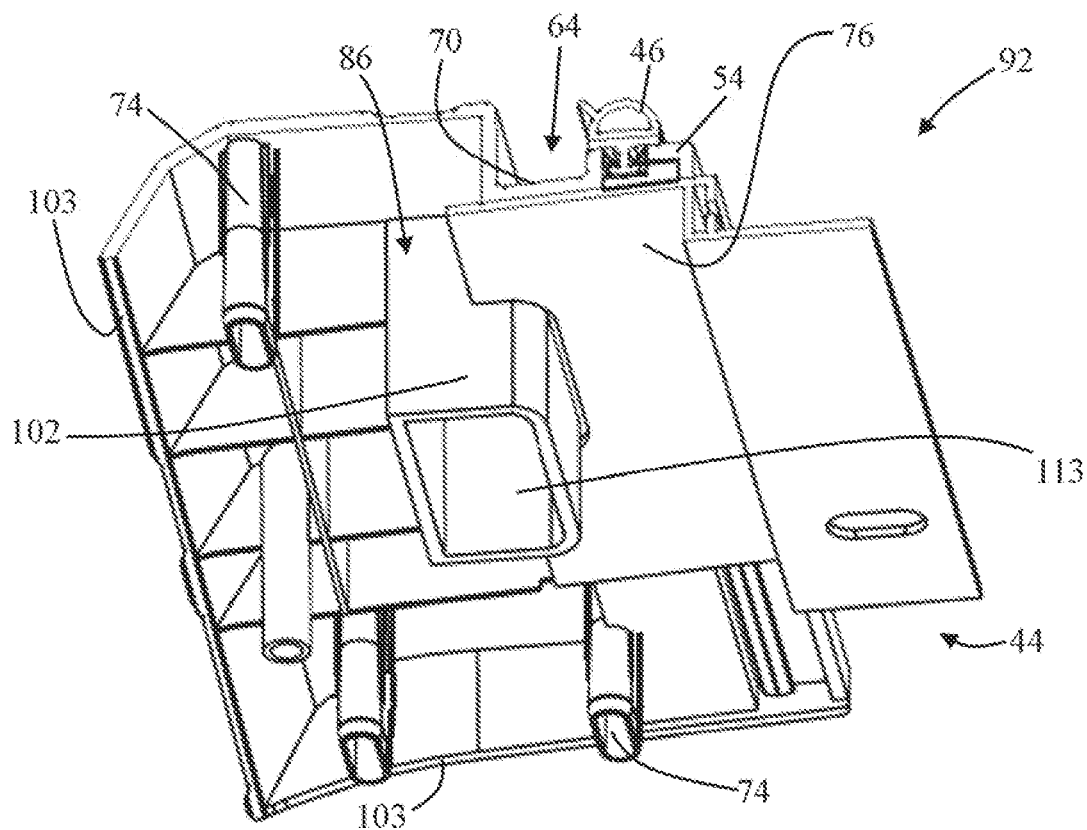
FIG. 6 is a bottom perspective view of FIG. 5
Figure 8A:
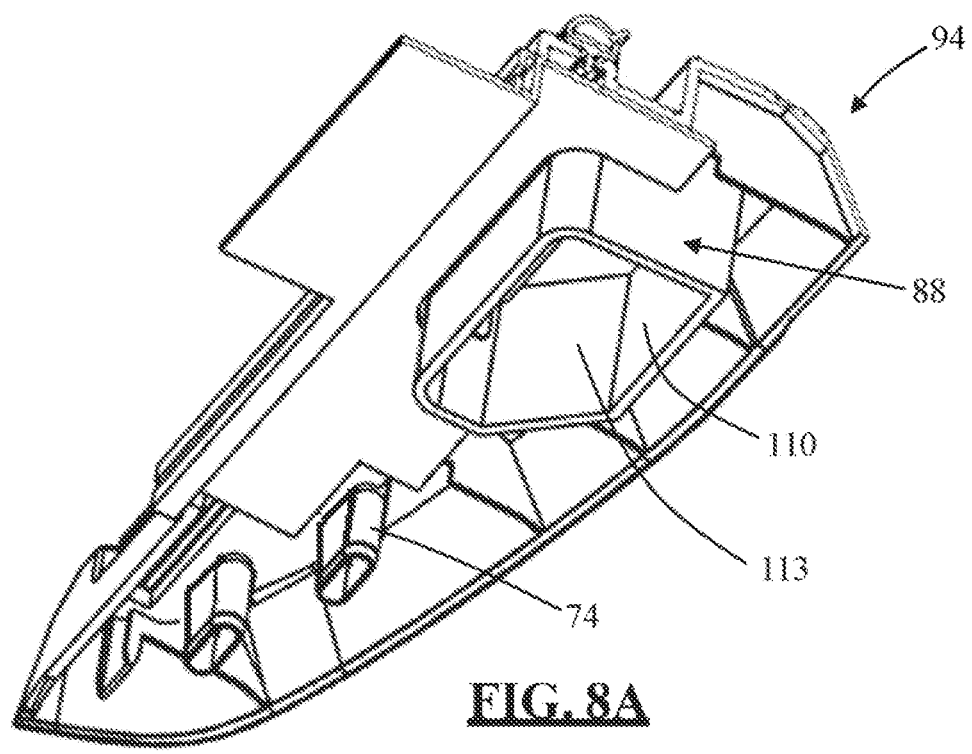
FIG. 8A is a bottom perspective view of FIG. 7.
Figure 8B:
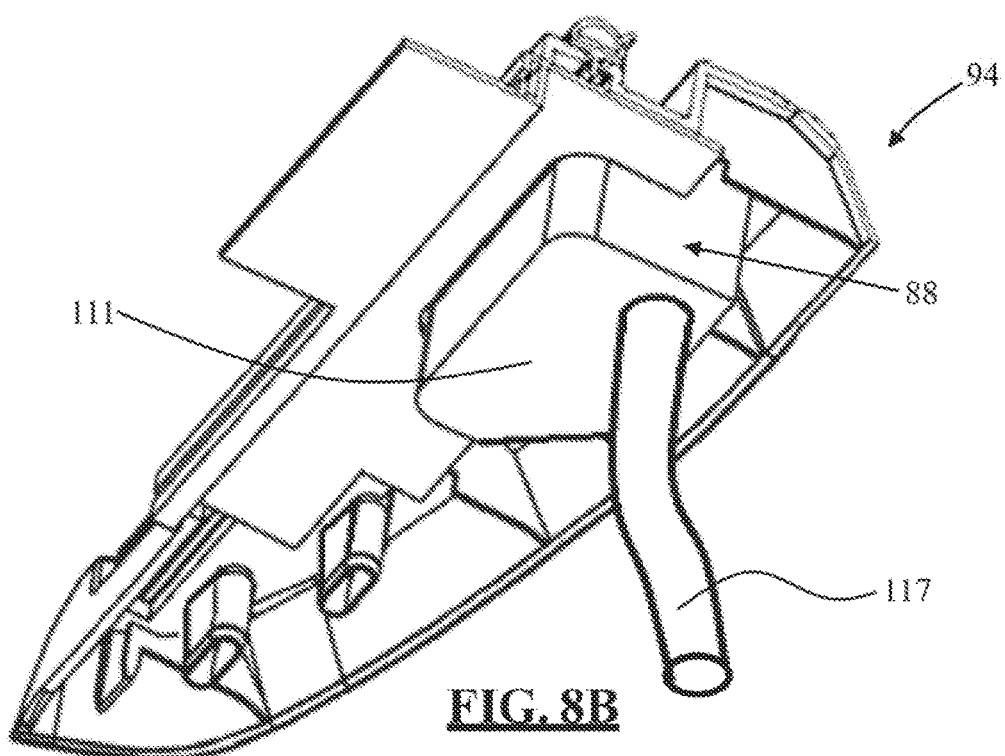
FIG. 8B is a bottom perspective view of FIG. 7.

The first support section 76 comprises drain cutouts 82, 84 that are configured to provide clearance for a respective downspout 86, 88 of the bed cap 42 (See also FIGS. 6 and 8A, 8B).

Figure 3A:
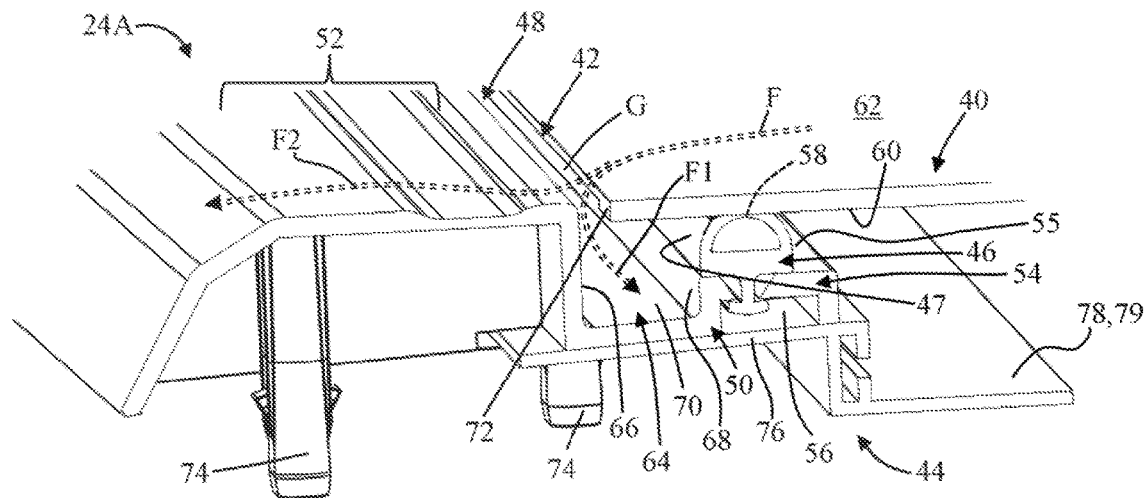
FIG. 3A is a cross-sectional view of a portion of the bed cap assembly and tonneau cover taken along line 3-3 in FIG. 1.

FIG. 3A illustrates a section of the driver side bed cap assembly 24A and tonneau cover 40 taken generally along line 3-3 in FIG. 1; however, the bed wall 18A has been removed for clarity. The bed wall 18A is illustrated and described at FIG. 9. The bed cap 42 comprises an upper portion 48 and a lower portion 50.

The upper portion 48 of the bed cap 42 has a top surface 52, which may be exposed or visible from above or outside of the cargo area 12 and/or vehicle 10 (i.e., when looking down onto the floor 22 of the cargo area 12 when the tonneau cover 40 is in an open position and also in the closed position illustrated in FIG. 3A). Wall 66 may define or separate the upper portion 48 from the lower portion 50.

The lower portion 50 of the bed cap 42 is located lower or closer to the floor 22 of the cargo area 12 (FIG. 1) compared to the upper portion 48, and is also located closer to the centerline CL of the vehicle 10 (FIG. 1) compared to the upper portion 48. The lower portion 50 is at least partially covered by the tonneau cover 40 from above when the tonneau cover 40 is in the closed position. The lower portion 50 comprises a ledge 54 and channel 64.

The ledge 54 has a top surface 55 that is located lower or below the top surface 52 of the upper portion 48 of the bed cap 42. The ledge 54 comprises a groove or channel 56 into which a portion of the seal 46 is configured to be received in. The channel 54 may include one or more fingers (Elements 57 in FIG. 3B), ribs, or undercut sections that are configured to retain at least a portion of the seal 46 to restrict separation of the seal 46 from the ledge 54 or bed cap 42. In some configurations, the ledge 54 may be free of a channel 54 and fingers 57 and, instead, the seal 46 may be located or attached to the top surface 55 of the ledge 54 via a fastener or adhesive.

The bed cap assembly 24A has a contact surface 58, which may be a top surface of the seal 46, also may also be referred to herein as a first contact surface 58. When the tonneau cover 40 is in the illustrated close position, a bottom surface 60 of the tonneau cover 40 is configured to contact and rest on the contact surface 58 and partially compress the seal 46.

The seal 46 may extend along an entire length of the bed cap 42 and/or ledge 54, or intermittently in sections along a length of the bed cap 42.

When the tonneau cover 40 is in the illustrated closed position, a top surface 62 of the tonneau cover 40 may be generally flush with the top surface 52 of the bed cap 42. However, depending on the size or height of the seal 46, a thickness of the tonneau cover 40, and/or the relative position of the ledge 54 relative to the top surface 52 of the bed cap 42, the top surface 62 of the tonneau cover 40 may be generally lower or sub flush with the top surface 52 of the bed cap 42, or generally higher or over flush with the top surface 52 of the bed cap 42. A flush relationship between the top surface 62 of the tonneau cover 40 and the top surface 52 of the bed cap 42 may provide a smooth look or improve aesthetics by providing what may appear to be a smooth or uniform tonneau cover assembly between the tonneau cover 40 and bed cap 24A.

The channel 64 of the bed cap 42 is part of the fluid management system 90. The channel 64 may have a U-shaped cross section, and is defined by a first wall 66, an opposing second wall 68, and a floor 70. A side or edge 47 of the seal 46 may be part of the wall defining the channel 64. The channel 64 may have a V-shaped configuration, where one or both of the walls 66, 68 are angled or sloped towards each other in a direction towards the floor 70. In some configurations, the channel 64 may be free of a floor 74 and only be defined by walls 66, 68.

With reference to the center line CL of the cargo area 12 (FIG. 1), the first wall 66 may be an outboard wall 66 and the second wall 68 and/or side 47 of the seal 46 may be an inboard wall 68. The walls 66, 68 may be generally vertical or perpendicular relative to the floor 70 or one or both of the walls 66, 68 may be angled or tapered or sloped relative to the floor 70. The walls 66, 68 may or may not be parallel to one another.

The channel 64 may function to provide a place or location for fluid and/or other debris to be gathered or collected and then drained so that the fluid and/or debris does not enter the cargo area 12 of the vehicle 10. The fluid and/or debris may be maintained in the channel 64 between the first wall 66, the floor 70, and the second wall 68. The side 47 of the seal 46 and the bottom 60 of the tonneau cover 40 may also cooperate with the wall 68 to maintain the fluid and/or debris inside of the channel 64. For example, the seal 46 may form a fluid tight seal with the top surface 55 of the ledge 54 and the bottom surface 60 of the tonneau cover 40 to prevent fluid and/or debris from leaking or seeping therebetween or else the fluid and/or debris may have an opportunity to leak or seep there between and undesirably flow into the cargo area 12.

The first support section 76 of the support member 44 is located below the floor 70 of the channel 64 and also below the ledge 54 and seal 46, and may provide an additional support structure or at rigidity to support the tonneau cover 40, the bed cap 42, the lower portion 50 of the bed cap 42, or a combination thereof. When the tonneau cover 40 is in the closed position, a portion of the tonneau cover 40 that is not illustrated in this figure is configured to contact or rest on the second support section 78 of the support member 44. Accordingly, the second support section 78 may also be referred to as a second contact surface 79 for the tonneau cover 40 to contact when the tonneau cover 40 is at least partially in a closed position. The first support section 76 is vertically offset from the second support section 78 relative to the floor 22 of the cargo area 12; however, in some configurations, the first support section 76 and the second support section 78 may be arranged in a same or common plane, or the second support section 78 may be elevated relative to the first support section 76.

When the tonneau cover 40 is in the illustrated closed position, a gap G may be defined between an outboard or lateral edge 72 of the tonneau cover 40 and the first wall 66 defining the channel 64.

When the vehicle 10 and/or tonneau cover 40 is exposed to fluid F, for example from a rain storm or car wash, or if a fluid is spilled on the top surface 62 of the tonneau cover 40, the fluid F and/or other debris may flow or travel along the top surface 62 of the tonneau cover 40 towards the bed wall 18A due to the tonneau cover 40 being sloped towards one or both of the bed caps 24A, for example.

The fluid F and/or debris may flow along a first flow path F1 into the gap G and then into the channel 64. The channel 64 is configured to collect the fluid and/or debris and prevent the fluid and/or debris from entering the cargo area 12. The fluid and/or debris from the first flow path F1 will be collected and maintained in the channel 64 between the first wall 66, the opposing second wall 68, the seal 46, and the floor 70 and will be restricted or prevented from entering the cargo area 12. As will be discussed below, fluid and/or debris collected in the channel 64 may be directed into one or more openings or drains or downspouts 86, 88 or ducts for draining or evacuating from the channel 64. In order for the fluid to enter the cargo area 12, the fluid would need to flow or seep into or between the bottom surface 60 of the tonneau cover 40 and the top or contact surface 58 of the seal 46 and/or between the seal 46 and the bottom surface 55 of the ledge 54. However, due to the weight of the tonneau cover 40 contacting and compressing the seal 46, a fluid seal is created and/or maintained between the bottom surface 60 of the tonneau cover 40 and the seal 46 and between the seal 46 and the top surface 55 of the ledge 54. The fluid F may also flow along a second fluid flow path F2 over the gap G and along the top surface 52 of the bed cap 42 and then off of the side of the cargo area 12 or vehicle 10.

With continued reference to FIG. 3A, the bed cap 42 comprises one or more fasteners 74. The fasteners 74 are configured to locate and attach the bed cap assembly 24A to the bed wall 18A by engaging corresponding bores or apertures 112 in the bed wall 18A (FIG. 9).

The bed cap 42 can also be attached to the support member 44, and then the support member 44 is attached to the bed wall, to the top surface and/or inside wall of the bed wall. In such a configuration, the bed cap 42 may not be directly secured or attached to the bed wall, but is instead attached to the bed wall via or by way of the support member 44.

Figure 3B:
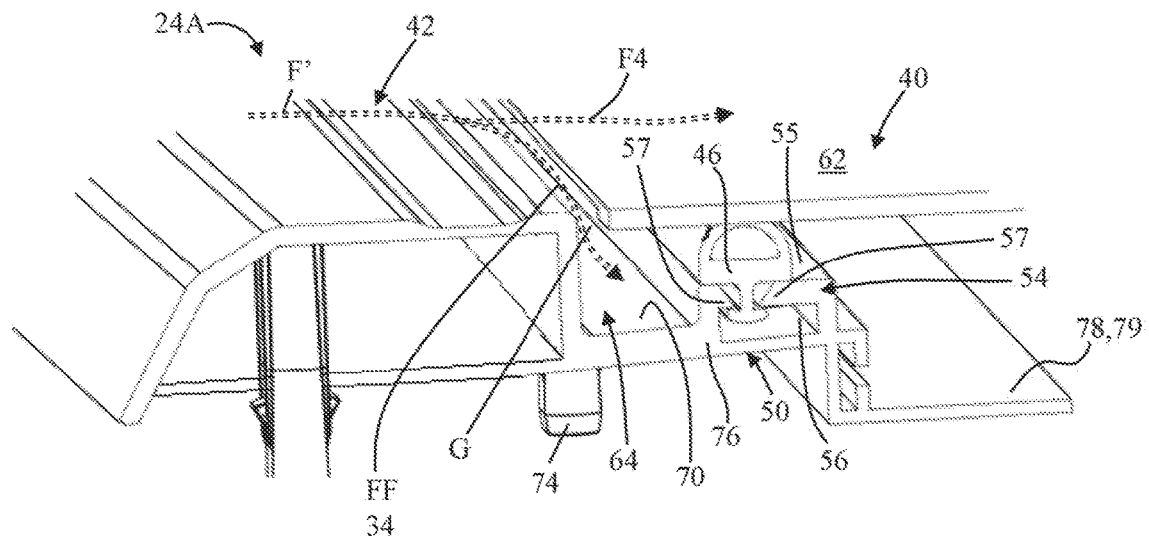
FIG. 3B is a cross-sectional view of a portion of the bed cap assembly and tonneau cover taken along line 3-3 in FIG. 1.

FIG. 3B illustrates another bed cap assembly 24A, where elements of the bed cap 42 and the support member 44 illustrated in FIG. 3A are combined or integrated. The bed cap assembly 24A includes many of the elements of the bed cap assemblies disclosed herein, including FIG. 3A, therefore, similar elements and their functions will not be repeated. In FIG. 3B, the first support section 76 that was previously part of support member 44 is instead formed as the bottom surface of the bed cap 42 and/or the bottom surface or floor 70 of the channel 64. The second support section 78 may then be connected to the lower portion 50 of the bed cap 42 or the first support section 76 or the floor 70 of the channel 64 and provide an area for a portion of the tonneau cover 40 to contact when in the closed position.

With continued reference to FIG. 3B, if fluid and/or debris are able to leak or seep or pass between the seal 46 and the bottom surface 55 of the ledge 54, the fluid and/or debris will pass into the groove or channel 56 where the fluid and/or debris will be maintained and/or directed into a drain or opening for draining or evacuating the fluid and/or debris from the channel 56.

FIG. 3B also shows another fluid flow path F that is opposite the fluid flow path F in FIG. 3A. The fluid F may flow into the gap G and into the channel 64 via path F3 or the fluid may flow over the gap G along path F4 onto the top surface 62 of the tonneau cover 40, where the fluid F3.

Figure 3C:
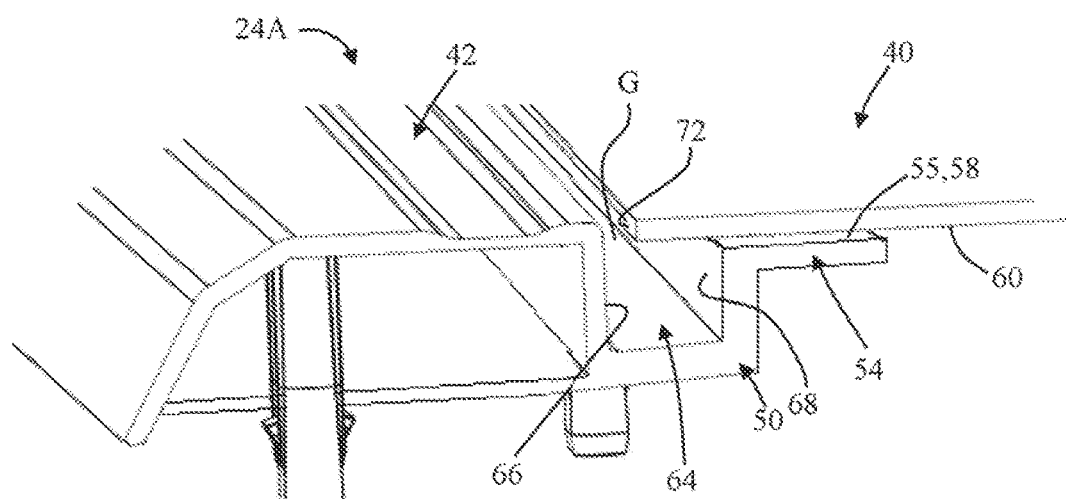
FIG. 3C is a cross-sectional view of a portion of the bed cap assembly and tonneau cover taken along line 3-3 in FIG. 1.

FIG. 3C illustrates another bed cap assembly 24A that includes many of the same elements of the bed cap assemblies disclosed herein, therefore, similar elements and their functions will not be repeated. The tonneau cover 40 is configured to contact or rest directly on the top surface 55 of the ledge 54, which thus becomes the contact surface 58. In some configurations, the bottom surface 60 of the tonneau cover 60 and/or the top surface 55 of the ledge 54 may include a plastic or rubber skin or other sealing material that may function to create a fluid tight seal between the tonneau cover 40 and the top surface 55 of the ledge 54 to prevent fluid or debris from leaking between the ledge 54 and the tonneau cover 40 and/or function as a damper to reduce or eliminate noise, vibrations, and harshness (NVH) during driving conditions. Fluid and/or debris may enter the channel 64 through the gap G defined between the edge 72 of the tonneau cover 40 and wall 66 via one or more of the fluid flow paths illustrated and described above in FIGS. 3A and 3B.

Figure 3D:
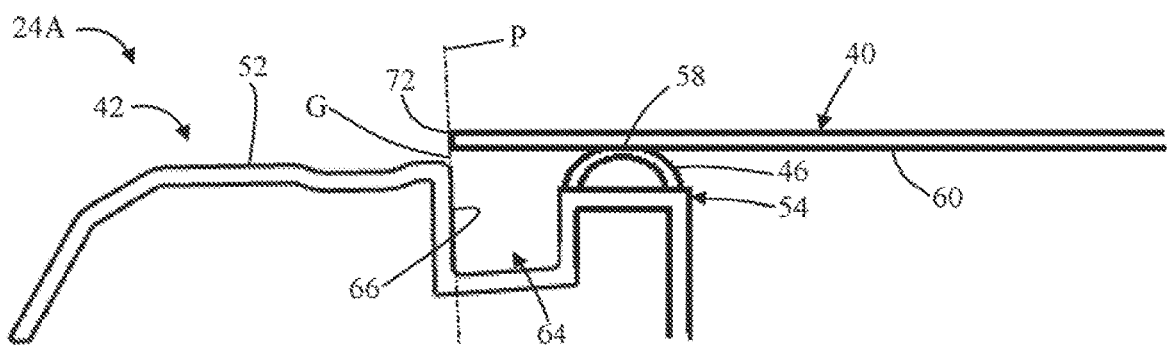
FIG. 3D is a cross-sectional view of a portion of the bed cap assembly and tonneau cover taken along line 3-3 in FIG. 1.

FIG. 3D illustrates another bed cap assembly 24A that includes many of the same elements of the bed cap assemblies disclosed herein, therefore, similar elements and their functions will not be repeated. When the tonneau cover 40 is in the illustrated closed position, and resting on the contact surface 58 on the seal 46, an outboard or lateral edge 72 of the tonneau cover 40 is generally aligned with the first wall 66 defining the channel 64 along a common axis or in a common plane P. A gap G is defined between the bottom surface 60 of the tonneau cover 40 and the top surface 52 of the bed cap 42 for fluid and/or debris to enter into the channel 64 along any of the flow paths disclosed herein.

Figure 3E:
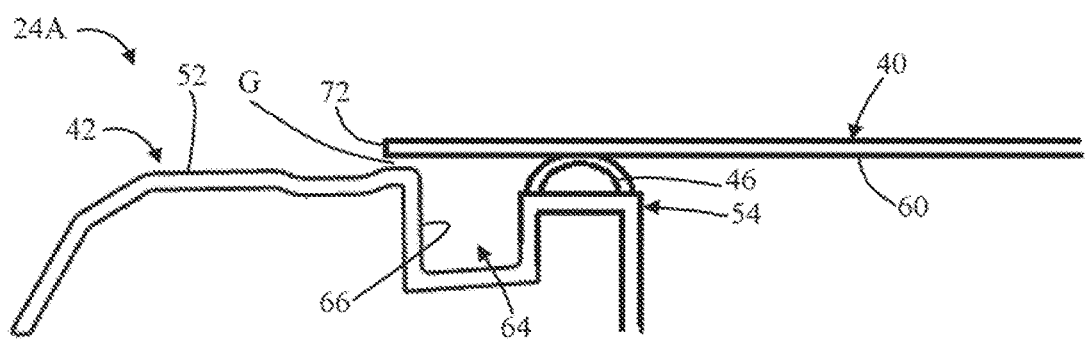
FIG. 3E is a cross-sectional view of a portion of the bed cap assembly and tonneau cover taken along line 3-3 in FIG. 1.

FIG. 3E illustrates another bed cap assembly 24A that includes many of the same elements of the bed cap assemblies disclosed herein, therefore, similar elements and their functions will not be repeated. When the tonneau cover 40 is in the illustrated closed position, an outboard or lateral edge 72 of the tonneau cover 40 is generally outboard of the first wall 66 defining the channel 64 so that at least a portion of the bottom surface 60 of the tonneau cover 40 overlaps the top surface 52 of the bed cap 42. A gap G may be defined between the bottom surface 60 of the tonneau cover 40 and the top surface 52 of the bed cap 42 for fluid and/or debris to enter into the channel 64.

Figure 3F:
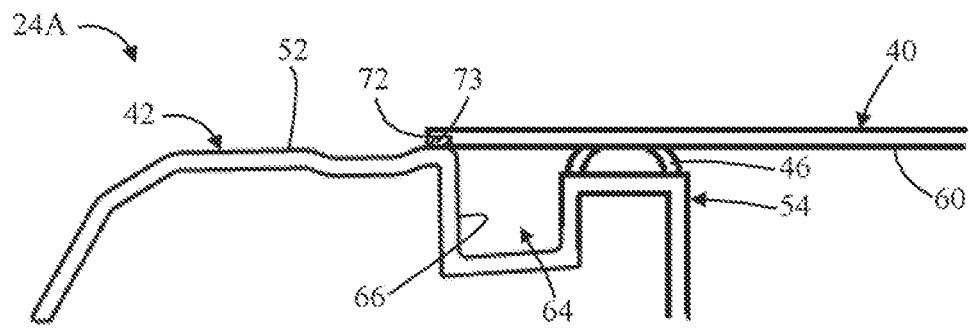
FIG. 3F is a cross-sectional view of a portion of the bed cap assembly and tonneau cover taken along line 3-3 in FIG. 1.

FIG. 3F illustrates another bed cap assembly 24A that includes many of the same elements of the bed cap assemblies disclosed herein, therefore, similar elements and their functions will not be repeated. When the tonneau cover 40 is in the illustrated closed position, an outboard or lateral edge 72 of the tonneau cover 40 is generally outboard of the first wall 66 defining the channel 64 so that at least a portion of the bottom surface 60 of the tonneau cover 40 overlaps or covers the top surface 52 of the bed cap 42. At least a portion of the bottom surface 60 of the tonneau cover 40 is configured to contact the top surface 52 of the bed cap 42 at a contact area 73 so that no gap is defined therebetween. However, any fluid and/or debris that enters or seeps between the bottom surface 60 of the tonneau cover 40 and the top surface 52 of the bed cap 42 will enter into the channel 64. In some configurations, a seal may be provided at the contact area 73, either on the bottom surface 60 of the tonneau cover 40 and/or on the top surface 52 of the bed cap 42 to assist in preventing fluid and/or debris from seeping or leaking between the tonneau cover 40 and the bed cap 42.

Figure 3G:
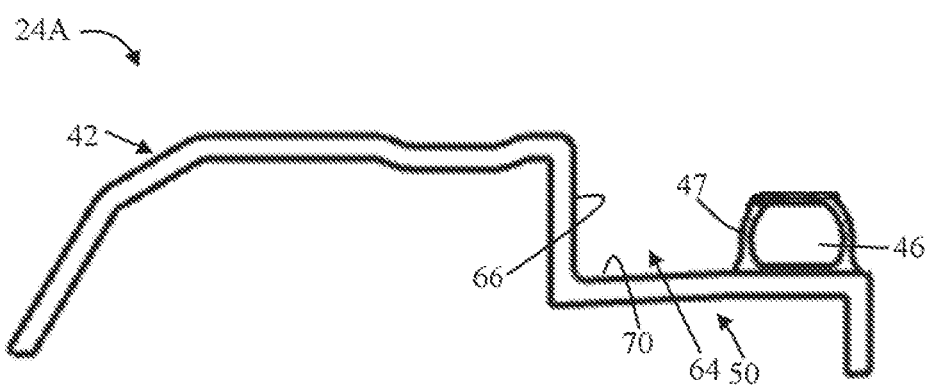
FIG. 3G is a cross-sectional view of a portion of the bed cap assembly and tonneau cover taken along line 3-3 in FIG. 1.

FIG. 3G illustrates another bed cap assembly 24A that includes many of the same elements of the bed cap assemblies disclosed herein, therefore, similar elements and their functions will not be repeated. The lower portion 50 of the bed cap 40 comprises the first wall 66 and floor 70, but is free of the second wall 68 and ledge 54 as illustrated in FIG. 3A-3F. Instead, the seal 46 is attached to the floor 70. In such a configuration, the channel 64 is defined by the first wall 66, the floor 70, and the side wall 47 of the seal 46.

Figure 3H:
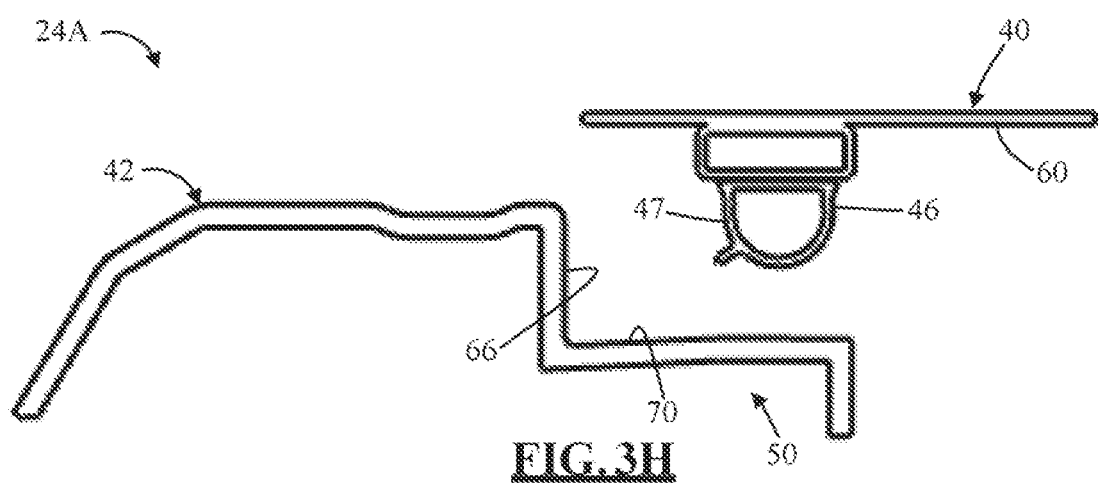
FIG. 3H is a cross-sectional view of a portion of the bed cap assembly and tonneau cover taken along line 3-3 in FIG. 1.

FIG. 3H illustrates another bed cap assembly 24A that includes many of the same elements of the bed cap assemblies disclosed herein, therefore, similar elements and their functions will not be repeated. The lower portion 50 of the bed cap 40 comprises the first wall 66 and floor 70, but is free of the second wall 68 and ledge 54 as illustrated in FIG. 3A-3F. In this configuration, the channel 64 may have an L-shaped cross section. The tonneau cover 40 comprises a seal 46 provided on the bottom surface 60.

Figure 3I:
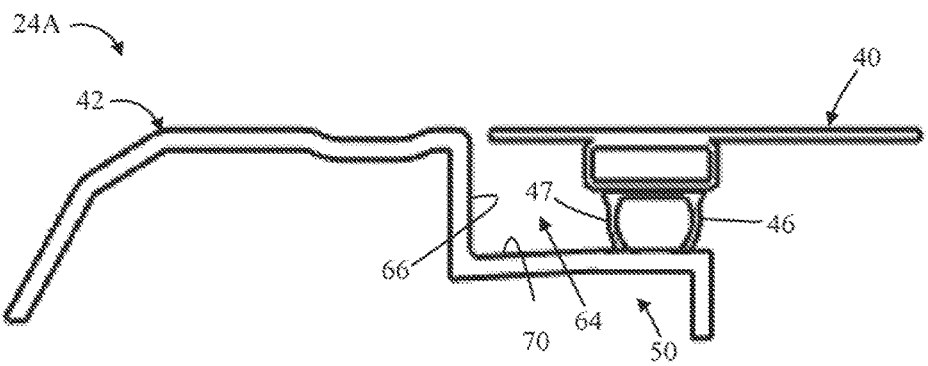
FIG. 3I is a cross-sectional view of a portion of the bed cap assembly and tonneau cover taken along line 3-3 in FIG. 1.

FIG. 3I illustrates the tonneau cover 40 of FIG. 3H in a closed position, where the seal 46 is in contact with the floor 70. The channel 64 is then formed or defined by the first wall 66, the floor 70, and the side wall 47 of the seal 46. The seal 46 forms a fluid seal with the floor 70 to restrict or prevent any fluid or debris from entering, seeping, or leaking between the seal 46 and the floor 70 and into the cargo area of the vehicle.

Figure 3J:
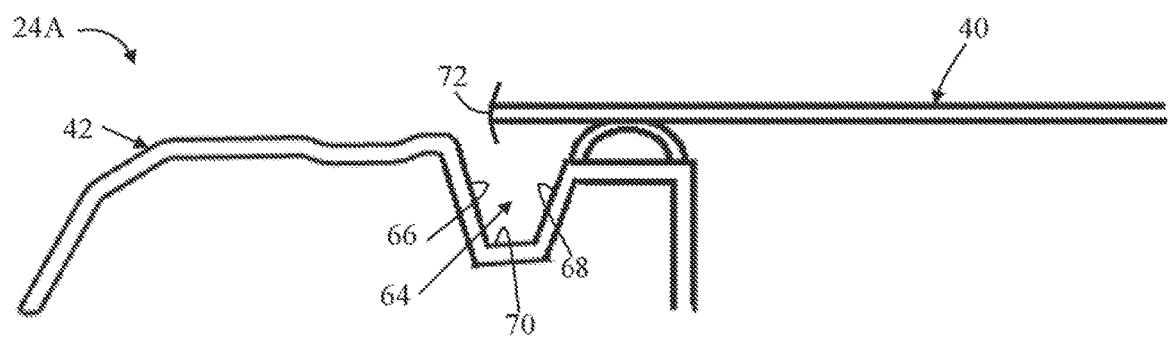
FIG. 3J is a cross-sectional view of a portion of the bed cap assembly and tonneau cover taken along line 3-3 in FIG. 1.

FIG. 3J illustrates another bed cap assembly 24A that includes many of the same elements of the bed cap assemblies disclosed herein, therefore, similar elements and their functions will not be repeated. The channel 64 comprises a first wall 66, a second wall 68, and a floor 70. The floor 70 is generally flat or may be slightly angled or sloped towards one wall 66, 68 or the other 66, 68. In this configuration, the channel 64 has a V-shaped cross section, where both walls 66, 68 are sloped or angled towards each other at the floor 70. However, in other configurations, only one of the walls 66, 68 can be sloped or angled, while the other wall 66, 68 is generally straight or not angled. In still other configurations, one or both of the walls 66, 68 may be angled in an opposite direction than the direction illustrated in FIG. 3J so that the channel 64 has an A-shaped cross section. The edge 72 of the tonneau cover 40 may be positioned in any location disclosed herein, including those illustrated above at FIGS. 3D-3F.

Figure 3K:
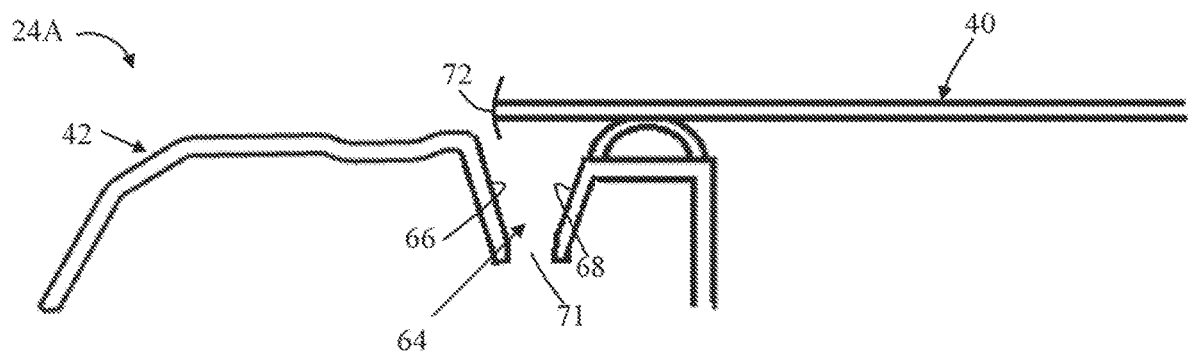
FIG. 3K is a cross-sectional view of a portion of the bed cap assembly and tonneau cover taken along line 3-3 in FIG. 1.

FIG. 3K illustrates another bed cap assembly 24A that includes many of the same elements of the bed cap assemblies disclosed herein, therefore, similar elements and their functions will not be repeated. The channel 64 comprises a first wall 66 and a second wall 68. One or both of the walls 66, 68 can be angled as show, or straight, or angled in an opposite direction as was discussed above at FIG. 3J. The channel 64 is free of a floor 70. In this configuration, the channel 64 has a V-shaped cross section, but has an open bottom or is floor-less. The debris and/or fluids are configured to be evacuated from the channel by flowing into or through an opening 71 defined between the two walls 66, 68. The opening 71 may extend along the entire length of the channel between the forward-most rearward-most ends of the channel, or only along selective portions thereof. A drain or downspout or other catch basin feature may be provided below the opening 71 to trap and/or guide the fluid and/or debris to a location external to the cargo area, for example into a cavity defined between the inside and outside walls of the bed wall. Alternatively, the debris and/or fluid may flow into/through the opening 71 and onto a top surface of the bed wall, where the debris and/or fluids will ultimately flow into an area external of the cargo area. The edge 72 of the tonneau cover 40 may be positioned in any location disclosed herein, including those illustrated above at FIGS. 3D-3F.

Figure 3L:
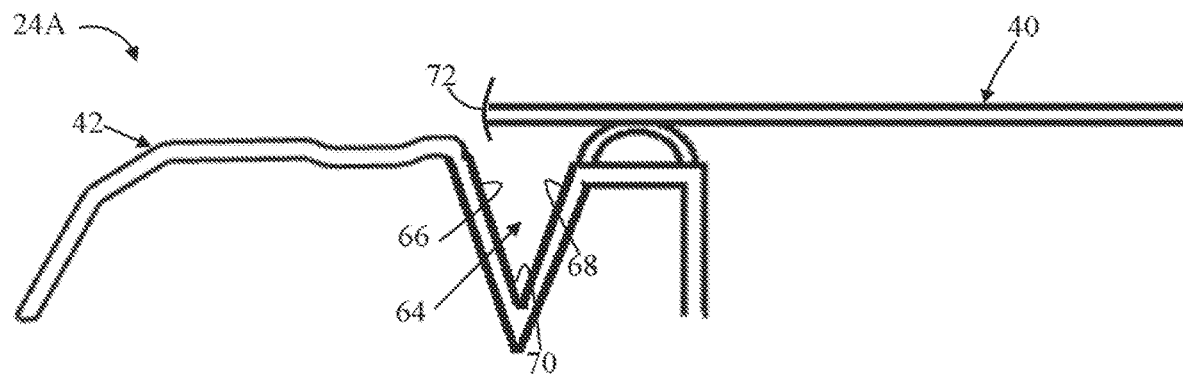
FIG. 3L is a cross-sectional view of a portion of the bed cap assembly and tonneau cover taken along line 3-3 in FIG. 1.

FIG. 3L illustrates another bed cap assembly 24A that includes many of the same elements of the bed cap assemblies disclosed herein, therefore, similar elements and their functions will not be repeated. The channel 64 comprises a first wall 66, a second wall 68, and a floor 70. The floor 70 is located between the angled walls 66, 68 so that the floor 70 may be at the bottom of the vertex or where the first wall 66 and the second wall 68 meet. In this configuration, the channel 64 has a V-shaped cross section, where both walls 66, 68 are sloped or angled towards each other at the floor 70. However, in other configurations, only one of the walls 66, 68 can be sloped or angled, while the other wall 66, 68 is generally straight or not angled. In still other configurations, one or both of the walls 66, 68 may be angled in an opposite direction than the direction illustrated in FIG. 3J so that the channel 64 has an A-shaped cross section. The edge 72 of the tonneau cover 40 may be positioned in any location disclosed herein, including those illustrated above at FIGS. 3D-3F.

Figure 4:
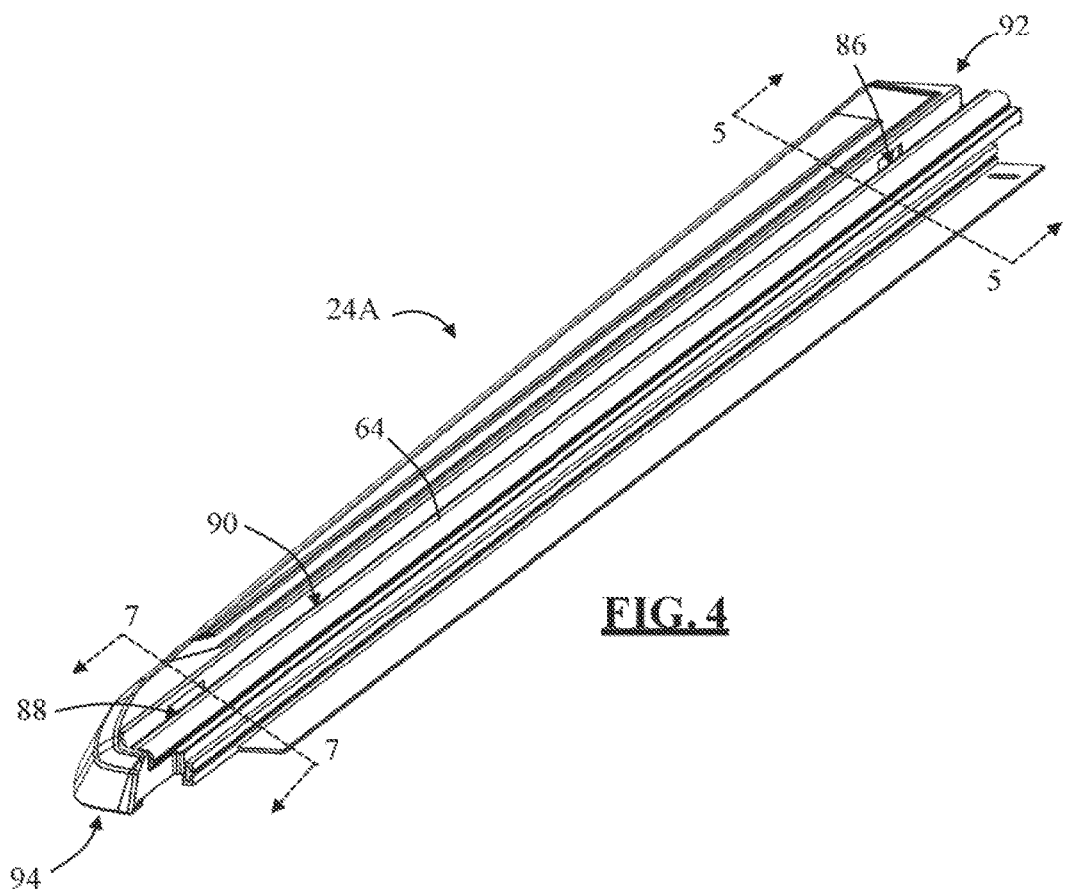
FIG. 4 is a perspective view of a bed cap assembly.

FIG. 4 illustrates the bed cap assembly 24A. The bed cap assembly 24A comprises a forward end 92 that is located adjacent the cab 14 of the vehicle 10 (FIG. 1) and a rearward end 94 that is located adjacent the tailgate 20 of the vehicle 10. The bed cap assembly 24A comprises a fluid management system 90. The fluid management system 90 comprises the channel 64, the downspout 86 or forward downspout located towards the forward end 92, and the downspout 88 or rearward downspout located towards the rearward end 94.

Figure 5:
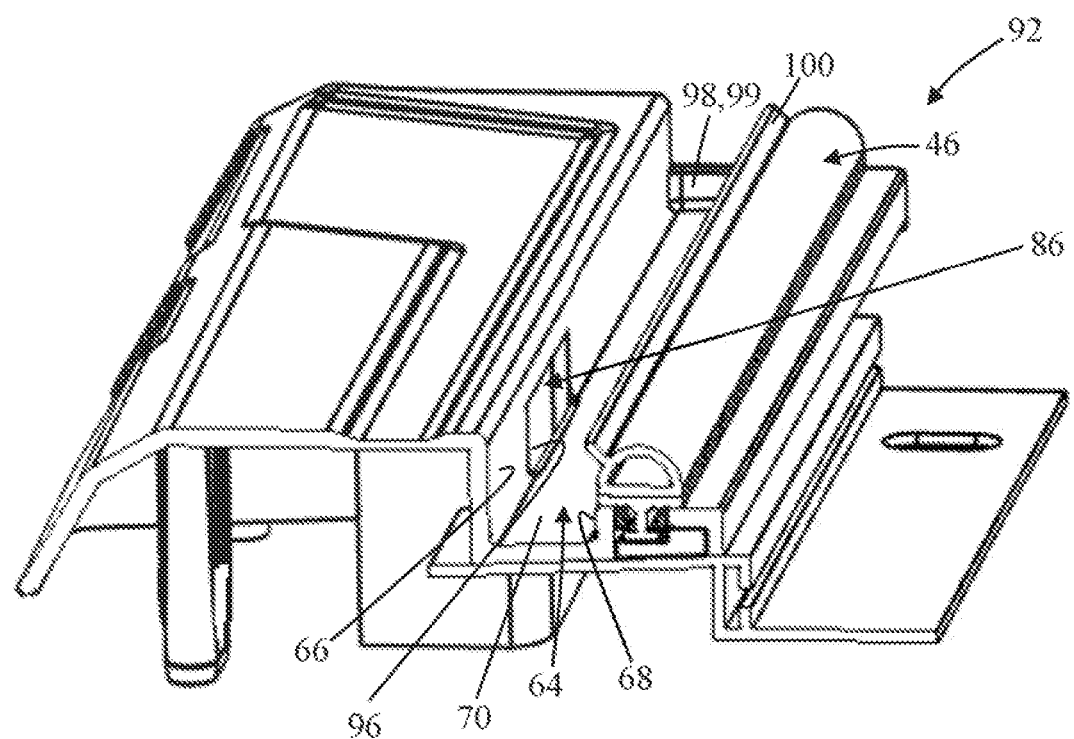
FIG. 5 is a cross-sectional view of the bed cap assembly taken along line 5-5 in FIG. 4.

FIG. 5 illustrates a section of the forward end 92 of the bed cap assembly 24A, taken along line 5-5 in FIG. 4. The first or forward downspout 86 includes a wall opening 96 defined in the first or outboard wall 66 of the channel 64. The wall opening 96 functions to provide for fluid and/or debris located in the channel 64 to be removed, drained, or evacuated from the channel 64. The floor 70 may be angled or tipped or sloped towards the wall opening 96 to assist in moving or evacuating fluid and/or debris into the wall opening 96. The floor 70 may be angled or tipped or sloped towards the opposite wall, for example if the other wall has an opening to assist in directing the fluid and/or debris into the opening for draining from the channel.

The floor 70 and/or inboard wall 68 defining the channel 64 may be free of any openings or apertures, at least in this section 92 of the bed cap assembly, or in the entire bed cap assembly. However, in some configurations, the floor and/or inboard wall 68 may include an opening or aperture in this section 92 of the bed cap assembly, or in other areas of the bed cap assembly for removing, draining, or evacuating the fluid and/or debris from the channel 64.

The channel 64 comprises a forward-most end 98 that includes a wall 99. The wall 99 is configured to block, restrict, or prevent fluid and/or debris from flowing out of the forward-most end 92 of the channel 64 or bed cap. In some configurations, the forward-most end 98 may be free of a wall 99 or may include an aperture or opening in the wall 99 through which fluid and/or debris may be drained or evacuated through the forward-most end 98 of the channel 64.

The seal 46 may include one or more whiskers or fingers 100 that are configured to be compressed by the tonneau cover 40 when the tonneau cover 40 is in a closed position. The whisker or finger 100 may assist in creating the fluid seal with the bottom surface 60 of the tonneau cover 40 so that fluid and/or debris are prevented from entering the cargo area 12 through a gap or space that may be defined between the seal 46 and the bottom surface 60 of the tonneau cover 40. In some configurations, the whisker or finger 100 may be located on the bottom surface 60 of the tonneau cover 40 and may be configured to contact the ledge or floor to create the fluid seal therebetween especially for use with some of the bed caps disclosed herein.

FIG. 6 illustrates a bottom of the forward end 92 of the bed cap assembly 24A of FIG. 5. The first or forward downspout 86 comprises a generally hollow duct 102 having an open bottom 113 that is configured to guide the fluid and/or debris out of the channel 64. The duct 102 is configured to fit into an aperture defined in the top surface 26 of the bed wall 18A, which may be a stake hole 114 (See FIG. 9). The duct 102 may have a size and shape that is generally the same size and shape or cross section as the stake hole 114. This allows the duct 102 to also serve as a locator or member for maintaining a position of the bed cap assembly on the bed wall. The duct 102 may be configured to guide the fluid and/or debris into the stake hole or other opening in the top surface of inside wall of the bed wall, and then into the open space or cavity defined between the inner wall 36 and outer wall 38 of the bed wall 18A (FIG. 1).

The first support section 76 of the support member 44 is located below the channel 64 and ledge 54 where the seal 46 is located to provide additional strength and/or rigidity to the bed cap and also to the tonneau cover 40 when the tonneau cover 40 is in the closed position and resting on the seal 46 and ledge 54.

The bed cap 42 comprises fasteners 74 for attaching the bed cap assembly 24A to the bed wall 18A (FIG. 9). Fasteners 74 may also be on the first support section 76 of the supporting member 44 for attaching the support member 44 directly to the bed wall 18A. In other configurations, the support member 44 may be attached directly to the bed wall 18A, and then the bed cap 42 is attached to the support member 44. In such a configuration, the bed cap 42 is not directly attached to the bed wall, but rather is attached or secured to the bed wall via the support member 42.

An outer edge or perimeter 103 of the bed cap 42 and/or a bottom surface of the first support section 76 may comprise a seal to restrict or prevent fluid and/or debris from passing or leaking between the outer edge or perimeter 103 of the bed cap 42 and the top surface or side wall of the bed wall (FIG. 9). The seal may also function to reduce or eliminate NVH (noise, vibration, and harshness) issues that may occur when the bed cap assembly 24A moves or vibrates on the bed wall while the vehicle 10 is moving.

Figure 7:
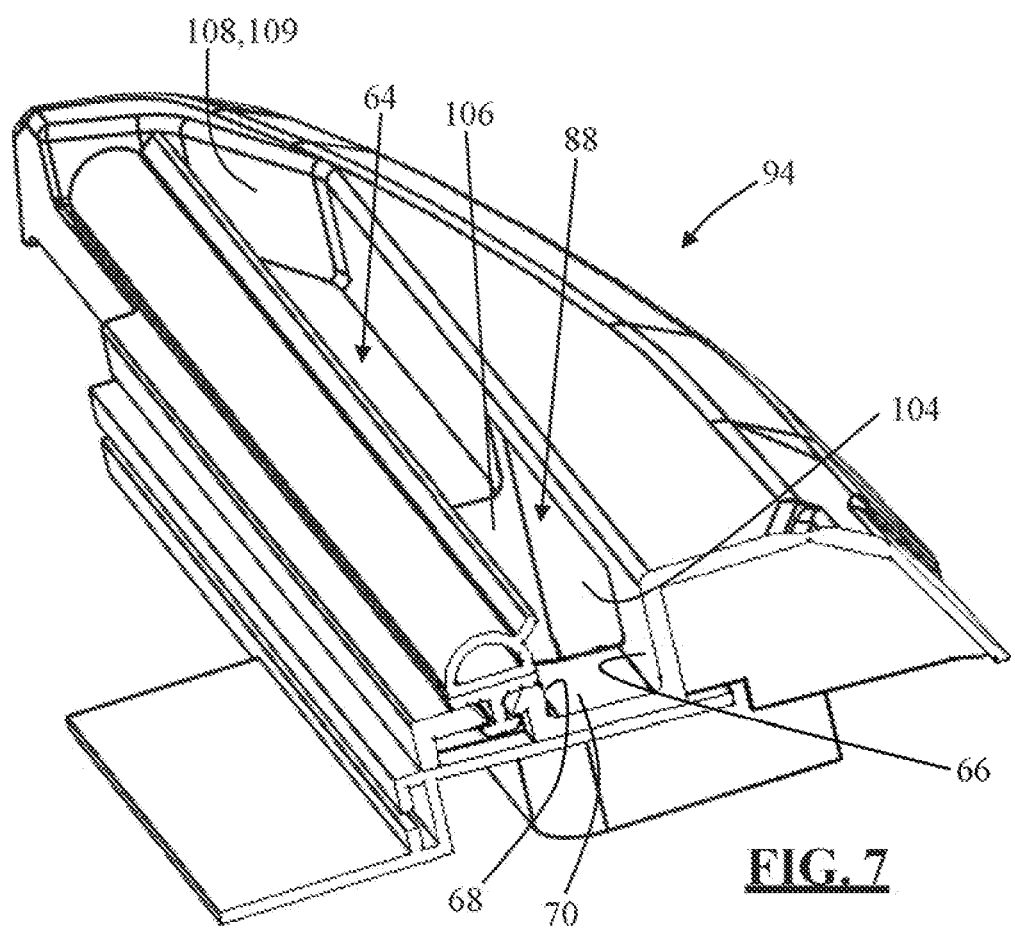
FIG. 7 is a cross-sectional view of the bed cap assembly taken along line 7-7 in FIG. 4.

FIG. 7 illustrates the rearward end 94 of the bed cap assembly 24A, taken along line 7-7 in FIG. 4. The second or rearward downspout 88 includes a wall opening 104 defined in the first or outboard wall 66 of the channel 64 and a floor opening 106 defined in the floor 70 of the channel 64. An opening may or may not be defined in the inboard wall 68 in this section 94 and/or in the rest of the bed cap. The openings 104, 106 are in communication with each other meaning the openings 104, 106 are connected together and cooperate to form a single opening or exit for removal or evacuation of fluids and/or debris from the channel 64. The openings 104, 106 are located in two different planes (i.e., the opening 106 is located in a horizontal plane and the opening 104 is located in a vertical plane). In other configurations, the openings 104, 106 may not be connected together and may thus define two separate, independent openings.

The channel 64 comprises a rearward-most end 108 having a wall 109 that is configured to block, restrict, or prevent fluid and/or debris from flowing out of the rearward-most end 94 of the channel 64. In some configurations, the rearward-most end 108 may be free of a wall 109 or may include an aperture or opening in the wall 109 through which fluid and/or debris may be drained or evacuated through the rearward-most end 94 of the channel 64.

FIG. 8A illustrates a bottom of the rearward end 94 of the bed cap assembly 24A of FIG. 7. The second or rearward downspout 88 comprises a generally hollow duct 110 having an open bottom 113 that is configured to guide the fluid and/or debris from the channel 64. The duct 110 is configured to fit into an aperture or stake hole 114 defined in the top surface 26 of the bed wall 18A (FIG. 9). The duct 110 is generally the same size and shape as the stake hole 114. In addition to draining or evacuating fluid and/or debris from inside of the channel 64, the duct 110 may function to allow the stake hole 114 to be used for attaching other components to the cargo area 12, like a ladder rack or other storage device through the opening 106 in the floor 70. In other words, the inside of the stake hole 114 is visible and accessible from above the bed cap assembly 24A when the tonneau cover is in an open position. Accessible means that an inside of the stake hole 114 is visible when looking down into the stake hole 114 from above. Accessible means that the inside of the stake hole 114 is not covered, blocked, or shielded by the bed cap assembly 24A.

FIG. 8B illustrates a bottom of the rearward end 94 of the bed cap assembly 24A of FIG. 7. The second or rearward downspout 88 comprises bottom wall 111 so that the downspout 88 is not generally hollow like in FIG. 8A. Instead, fluid and/or debris that are drained from the channel 64 can be collected in the downspout 88 and then drained therefrom via hose or drain 117 through an aperture defined in the bottom surface 111. The hose or drain 117 may be flexible and routed or directed into any opening or aperture in the bed wall, including on the top surface or even the inside wall of the bed wall. The hose or drain 117 may also be configured to guide or direct the fluid and/or debris to another end or side of the cargo area.

In some configurations, a tube, hose or drain, like hose 117, may be in fluid communication with one or more floor or wall openings for evacuating the fluid and/or debris from the channel 64 and into one or more aperture in the bed wall that may be defined in the top surface or inner wall of the bed wall.

FIG. 9 illustrates a portion of the wall or bed wall 18A. Bed wall 18A includes a top surface 26. The top surface 26 includes one or more apertures 112. The one or more fasteners 74 of the bed cap assembly 24A may be received or installed in the apertures 112 to connect or attach the bed cap assembly 24A to the bed wall 18A.

The bed wall 18A includes the inside wall 36, the outside wall 38, and an open space or cavity 37 defined between the two walls 36, 38.

The bed wall 18A includes one or more stake holes 114. The ducts 102, 110 and/or tube 117 are configured to be received into the stake holes 114 so that fluid and/or debris from the channel 64 can be drained or evacuated into the stake holes 114 and into the open space or cavity 37 defined between the inner and outer walls 36, 38 of the bed wall 18A (FIG. 1). The ducts 102, 110 and/or tube 117 can also be sized and configured to direct fluid and/or debris into other apertures or openings in the bed walls or sheet metal that are not stake holes and which may be located in the top surface of the bed walls or even in the inner wall 36 of the bed wall. The ducts 102, 110, and/or tube 117 can also direct the fluid and/or debris through the top surface 26 of the bed wall 18A and then direct or guide the fluid and/or debris down through the floor 22 of the cargo area 12 (FIG. 1) to an external area of the cargo bed 12 and/or vehicle 10.

The opposing wall or bed wall 18B may be a mirror image of the wall of bed wall 18A, and may include one or more or all of the features of the wall or bed wall 18A. The wall or tailgate 20 and/or wall or front wall 16 may include one or more, or all of the features of the wall or bed wall 18A including the apertures 112 and/or take holes 114 for attaching the respective bed cap assembly 28, 32 to the corresponding wall 20, 16.

Figure 10:
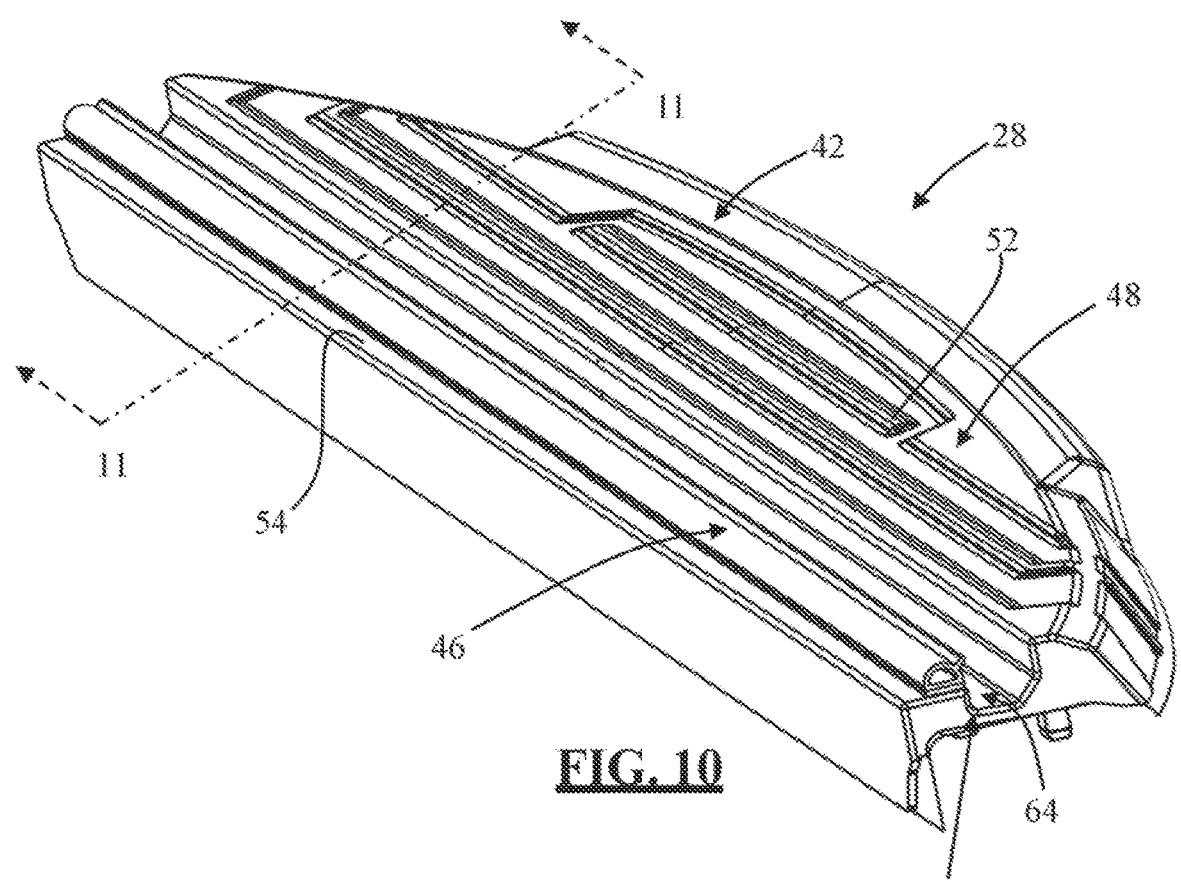
FIG. 10 is a perspective view of a bed cap assembly.
Figure 11:
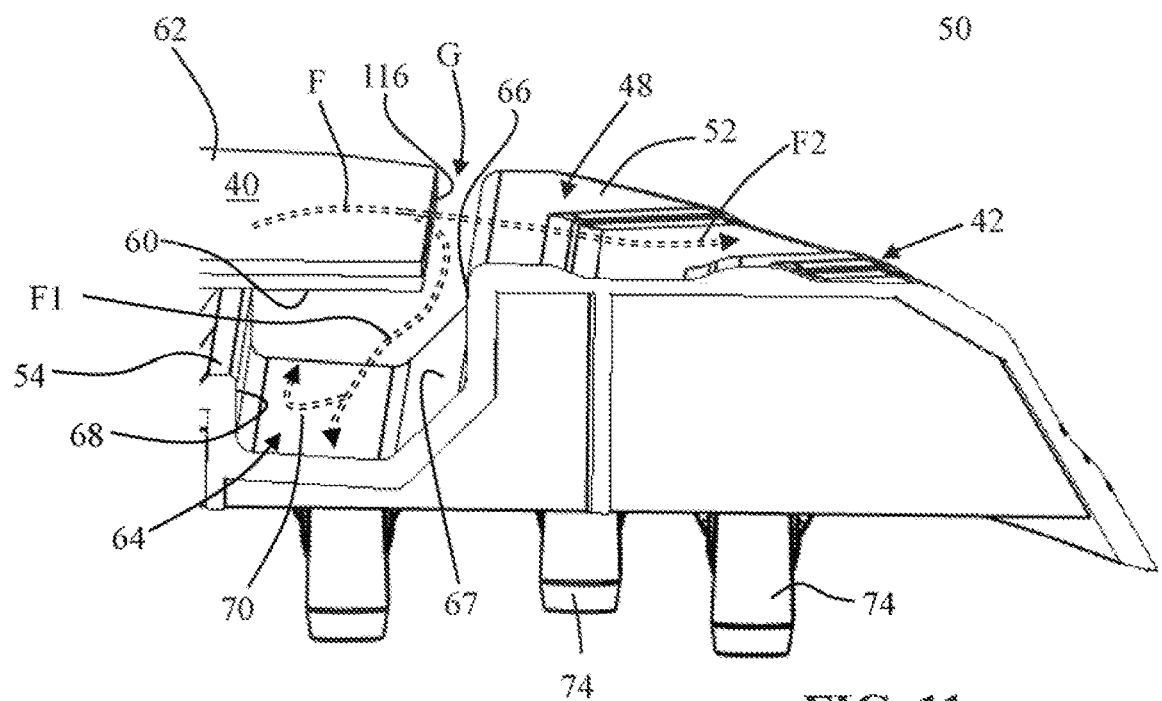
FIG. 11 is a cross section view of the bed cap assembly taken along line 11-11 of FIG. 10.

FIGS. 10 and 11 illustrate the bed cap assembly 28 for the tailgate 20. The bed cap assembly 28 may include one or more of the features of the bed cap assemblies disclosed herein. The bed cap assembly 28 comprises an upper portion 48 and a lower portion 50. The upper portion 48 has a top surface 52, which may be exposed or visible from outside of the cargo area 12 and/or vehicle 10 when the tonneau cover 40 is in an open position, or in a closed position illustrated in FIG. 11. The lower portion 50 is located lower or closer to a floor 22 of the cargo area 12 (FIG. 1) compared to the upper portion 48.

The lower portion 50 comprises a ledge 54. The ledge 54 is located lower or below the top surface 52 of the upper portion 48. A seal 46 may be located on the ledge 54 or in a channel or groove defined in the ledge 54. In some configurations, the seal 46 may be located on a bottom surface of the tonneau cover 40 and the ledge 54 may be free of a seal. In other configurations, the seal may be eliminated and instead there may be a plastic or rubber skin on the ledge and/or bottom surface of the tonneau cover. In some configurations, the ledge 54 may be eliminated, and the seal 46 may be attached to the floor 70 of the channel 64, like in FIG. 3G. In other the ledge 54 may be eliminated, and the seal 46 may be attached to the bottom side 60 of the tonneau cover 40, like in FIGS. 3H and 3I.

When the tonneau cover 40 is in the illustrated closed position in FIG. 11, the bottom surface 60 tonneau cover 40 is configured to rest on the seal 46 and/or compress the seal 46. When the tonneau cover 40 is in the closed position, a top surface 62 of the tonneau cover 40 may be generally flush with the top surface 52 of the upper portion 48 of the bed cap assembly 28. However, depending on the size or height of the seal 46, a thickness of the tonneau cover 40, and/or the relative position of the ledge 54 of the lower portion 50 relative to the top surface 52 of the upper portion 48, the top surface 62 of the tonneau cover 40 may be generally lower or sub flush with the top surface 52 of the upper portion 48 or generally higher or over flush with the top surface 52 of the upper portion 48. A flush relationship between the top surface 62 of the tonneau cover 40 and the top surface 52 of the bed cap assembly 28 may provide a smooth look or improve aesthetics by providing what may appear to be a smooth or uniform tonneau cover assembly of the tonneau cover 62 and bed cap assembly 28. In other configurations, a position of the tonneau cover 40 relative to the bed cap 28 may be like those illustrated and described above in any of FIGS. 3D-3F.

The bed cap assembly 28 comprises a channel 64. The channel 64 has a generally U-shaped cross section, and extends in a cross-car direction, or in a direction that is generally perpendicular or otherwise at an angle relative to the centerline CL of the vehicle 10 or cargo area 12 in FIG. 1. The channel 64 is defined by a first wall 66, a first angled wall 67, a second wall 68 that opposes walls 66, 67, and a floor 70. In some configurations, the walls 66, 67 may be a single planar wall. In other configurations, the second wall 68 may have two (or more) wall sections like the walls 66, 67. With reference to the center line CL of the cargo area 12, the first wall 66 and the first angled wall 67 may be outboard walls, and the second wall 68 may be an inboard wall. One or more of the walls 66, 67, 68 may be angled, curved. For example, the channel 64 may have a V-shaped cross section, where one or more of the walls 66, 67, 68, are angled towards each other in a direction towards the floor 70.

The channel 64 may be free of any end walls, like the end walls 98, 108 illustrated and described in FIGS. 5 and 7 so that fluid and/or debris may exit the channel 64 at the ends thereof. However, in some configurations, one or both ends of the channel 64 may include a corresponding end wall like those illustrated and described above at 98, 108. The channel 64 in the bed cap assembly 28 may be free of any downspouts 86, 88 or openings 96, 104, 106 defined in the floor 70 and/or walls 66, 67, 68. However, in some configurations, the floor 70 and/or walls 66, 67, 68 may include one or more openings 96, 104, 106 or downspouts 86, 88 or drains or hoses or tubes for evacuating fluid and/or debris from inside of the channel 64 to an area outside of the cargo area, such as, for example out of the outside wall 38 of the tailgate and/or into an inner space defined between the inner and outer walls 36, 38 defining the tailgate or end wall 20.

When the tonneau cover 40 is in the illustrated closed position in FIG. 11, a gap G may be defined between an outboard or rearward edge 116 of the tonneau cover 40 and the first wall 66. Again, a position of the outboard or rearward edge 116 of the tonneau cover 40 relative to the first wall 66 may be like any of those illustrated and described above in FIGS. 3D-3F.

When the vehicle 10 and/or tonneau cover 40 is exposed to moisture or fluid F, the fluid F may flow or travel along a first fluid flow path F1 into the gap G and into the channel

64. The fluid flow F1 will be maintained in the channel 64 between the walls 66, 67 and 68 and seal 46 and the floor 70 and restricted or prevented from entering the cargo area 12. The channel 64 may guide the fluid flow F1 out of the channel 64 at either end of the channel 64 that is open to the environment (i.e., towards passenger or driver side).

The fluid F may also flow along a second fluid flow path F2 over the gap G and along the top surface 52 of the upper portion 48 of the bed cap assembly 28 and down the tailgate 20 off of the back end of the vehicle 10.

The bed cap assembly 28 includes fasteners 74 for attaching the bed cap assembly 28 to a top surface of the tailgate (not illustrated) similar to the apertures 112 illustrated and described in the bed wall 18A at FIG. 9. A support member, like the support member 44 may be provided between the bed cap assembly 28 and the top surface of the tailgate 20. Alternatively, one or more features of the support member 44 may be incorporated into the bed cap assembly 28.

Figure 12:
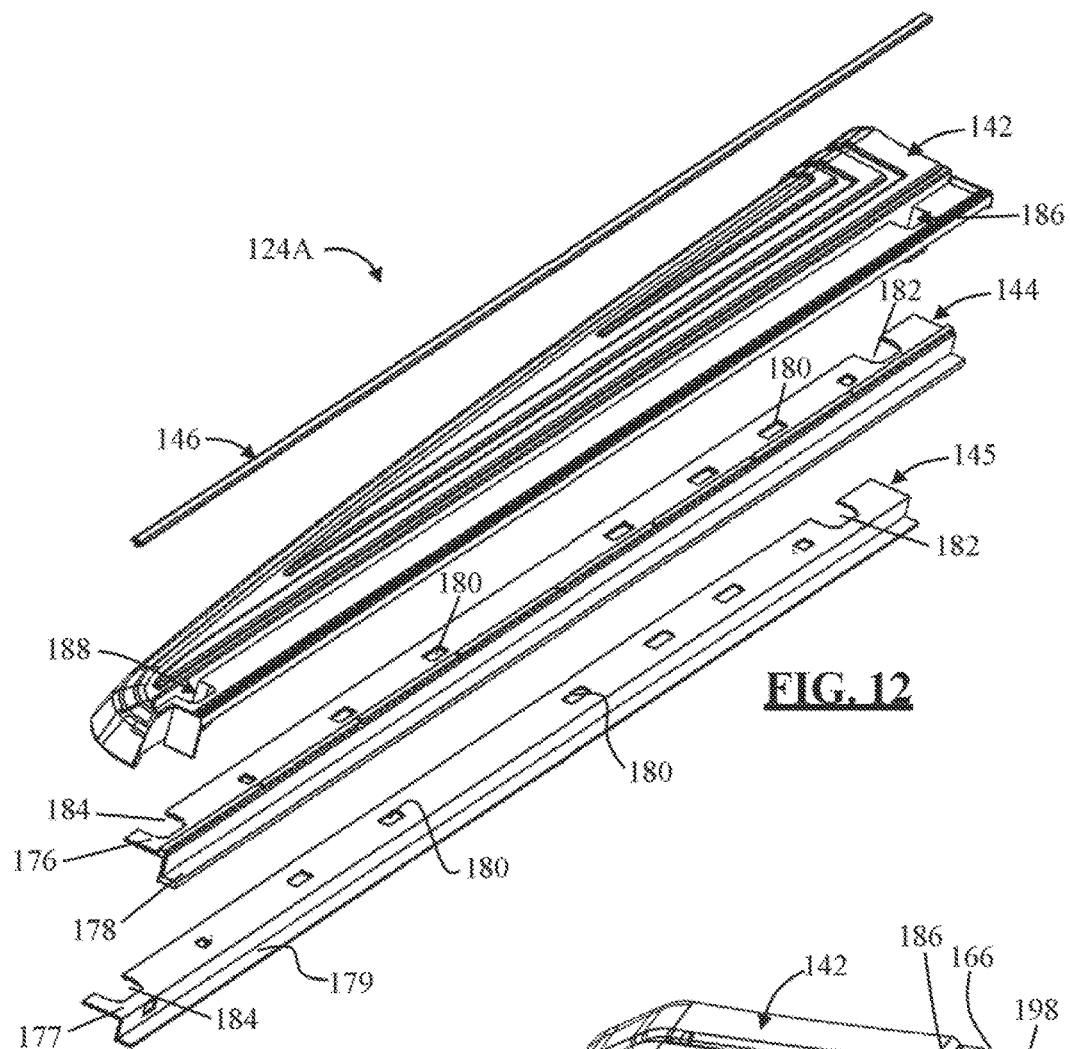
FIG. 12 is an exploded view of a bed cap assembly.
Figure 13:
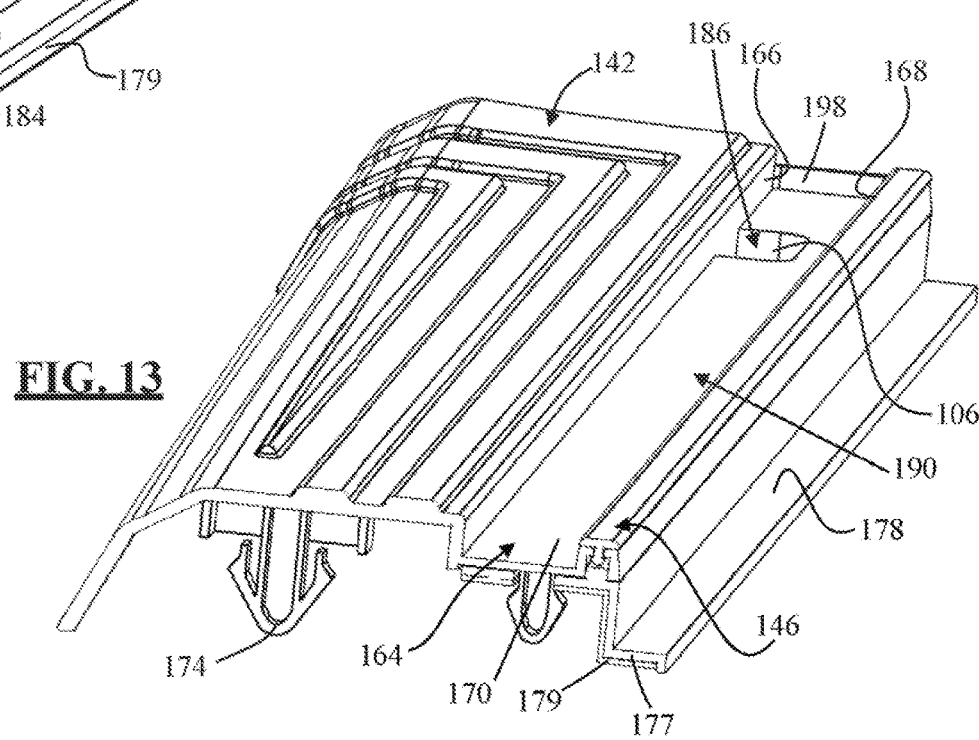
FIG. 13 is a cross-sectional view of the assembled bed cap assembly of FIG. 12.

FIGS. 12 and 13 illustrate another bed cap assembly 124A that may be used in place of the bed cap assembly 24A illustrated and described above. Alternatively, one or more features of the bed cap assemblies 124A and 24A may be combined into a bed cap assembly for use with any of the walls defining the cargo area 12. The bed cap assembly 124A is configured to be attached to the bed wall 18A of the vehicle 10 (i.e., driver's side). A mirror image of the bed cap assembly 124A may be configured to be attached to the bed wall 18B of the vehicle 10 (i.e., passenger side). The mirror image of the bed cap assembly 124A may include one or more or all of the features of the bed cap assembly 124A and/or 24A.

The bed cap assembly 124A comprises a bed cap 142, a support member 144, a second support member 145, and a seal 146. In the assembled configuration (FIG. 13), the support members 144, 145 may be nested or stacked on top of one another to provide support under the bed cap 142 and the tonneau cover 40, similar to the support member 44 described above. Having the additional support member 145 functions to provide additional support for the tonneau cover 40. In other configurations, the support member 144 may be a decorative component to cover the structural member 145. In other words, support member 144 may have the same finish as the bed cap 42 while support member 145 may be made of metal or another structural material.

The support members 144, 145 may include one or more of the same elements as the support member 44 described above, including apertures 180 for fasteners 174 of the bed cap assembly 124A to pass through, drain cutouts 182, 184 to accommodate the ducts of the downspouts 186, 188, and support sections 178, 179 to provide a support surface for a portion of the tonneau cover 40 to contact or rest when in the closed configuration.

The bed cap assembly 124A includes a fluid management system 190 like the system 90 illustrated and described above. The fluid management system 190 includes a channel 164 extending between opposing end walls (only one end wall illustrated in FIG. 13 at 198). In some configurations, the channel 164 may be free of one or both end walls or may include apertures defined in one or both end walls. The channel 164 is defined by a first wall 166, an opposing second wall 168, and a floor 170. A floor opening 106 is defined in the floor 170 thereby defining a downspout 186. The downspout 186 functions to evacuate fluid and/or debris inside of the channel 164 into the open area defined between the inner and outer walls of the bed wall 18A to which the bed cap assembly 124A is attached.

The downspout 186 comprises a duct (not illustrated), like the duct 102 illustrated at FIG. 6, that is configured to be received into a stake hole 114 defined in the top surface 26 of the bed wall 18A (FIG. 9). The size and shape of the duct is configured to substantially match the size and shape of the stake hole 114. Advantageously, this allows the stake hole 114 to be used not only for draining or evacuating fluids and/or debris from the channel 164, but also for attaching other components to the cargo area 12, like a ladder rack or other storage device when the tonneau cover 40 in an open or retracted position. In other configurations, the opening 186 may direct the fluid and/or debris into a hose or tube (like tube 117 at FIG. 8B) that may then direct the fluid and/or debris into an aperture anywhere in the side wall or another wall defining the cargo bed 12 to evacuate the fluid and/or debris into any location.

With additional reference back to FIG. 3, when the tonneau cover 40 is in the closed configuration, a gap is defined between the edge 72 of the tonneau cover 40 and the wall 166 of the channel 164 in FIG. 13. Fluid and/or debris may enter the channel 164 through the gap G and then be evacuated from the channel 164 through the downspout 186. In other configurations, the position of the edge 72 of the tonneau cover relative to the wall 166 may be like any of those illustrated and described above at FIGS. 3D-3F.

Figure 14A:
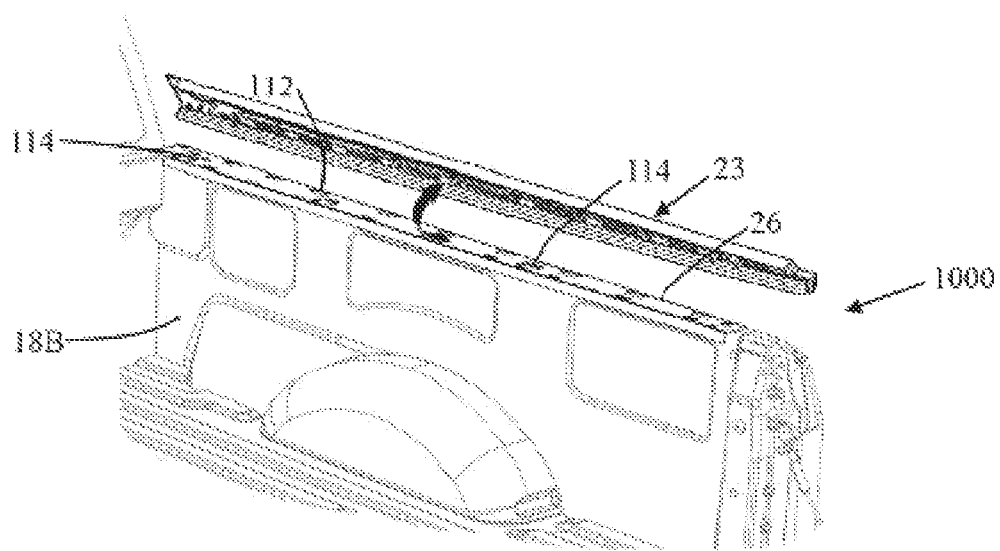
FIG. 14A is a perspective view showing removal of a bed cap assembly.
Figure 14B:
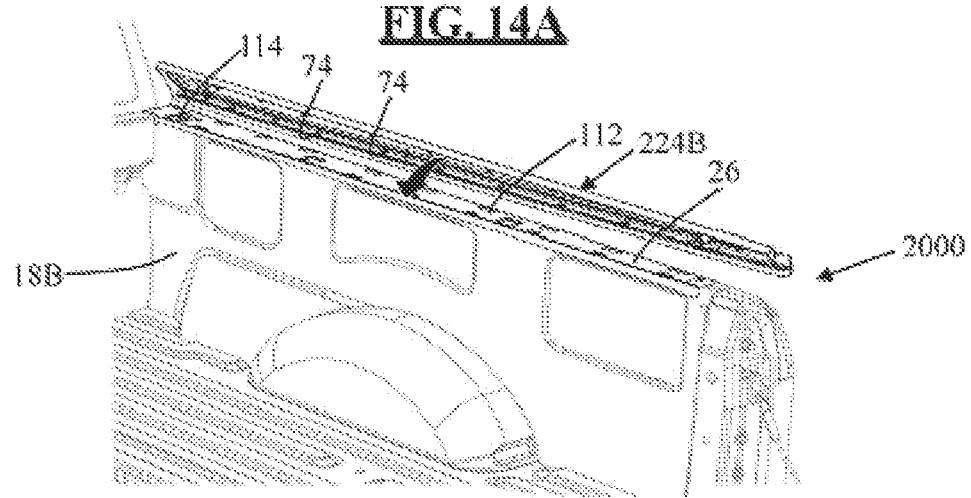
FIG. 14B is a perspective view showing attachment of a bed cap assembly according to these teachings to a wall defining the cargo area.
Figure 14C:
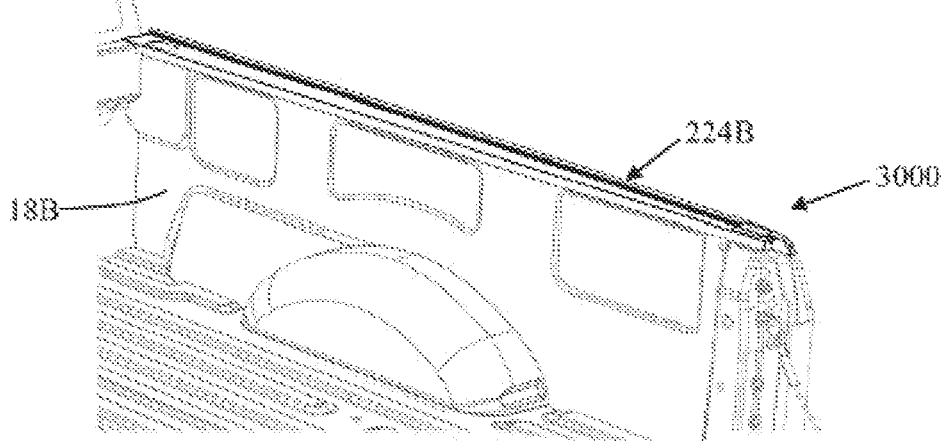
FIG. 14C is a perspective view showing the bed cap assembly according to these teachings attached to the wall defining the cargo area.

FIGS. 14A-14C illustrates a method of removing a bed cap assembly 23 from a bed wall 18B of a cargo area, and installing a bed cap assembly according to any of these teachings onto the bed wall 18B. For purposes of this method, the bed cap assembly according to any of these teachings will be referred to with reference numeral 224B.

At FIG. 14A, the method includes a step 1000 of removing the bed cap assembly 23 from the bed wall 18B of a cargo area 12 by grasping and pulling the bed cap assembly 23 upwardly and away from the top surface 26 of the bed wall 18B and/or at an angle away from the top surface 26 of the bed wall 18B. After the bed cap assembly 23 is separated from the bed wall 18B, the top surface 26 of the bed wall 18B is visible or exposed, including the one or more apertures 112 and stake holes 114 defined in the top surface 26 of the bed wall 18B.

At FIG. 14B, the method includes a step 2000 of installing the bed cap assembly 224B onto the top surface 26 of the bed wall 18B. The step 2000 includes aligning the one or more ducts 102, 110 and/or hoses or drains 117 with the one or more stake holes 114 or other openings in the top surface 26 of the bed wall 18B. The step 2000 also includes aligning the one or more fasteners 74 with the one or more openings 112.

Before the step 2000, the method may include a step of attaching a support member, like the support member 44 or 114, 145, 244, or any other support member disclosed herein, onto the top surface 26 of the wall 18B. The support member may be attached to the bed wall 18B with one or more fasteners or with the one or more fasteners 74 from the bed cap assembly 224B passing through one or more openings in the support member.

At FIGS. 14B-14C, the method includes a step 3000 of applying a force onto the bed cap assembly 224B so that the more ducts 102, 110 and/or hoses or drains 117 enter or engage the one or more stake holes 114 or other openings in the top surface 26 of the bed wall 18B and the one or more fasteners 74 enter or engage the one or more openings 112. One or more seals and/or adhesives may be provided between the top surface 26 of the bed wall 18B and the bottom surface of the bed cap assembly 224B to assist with securing the bed cap assembly 224B to the wall 18B, to reduce or prevent noise, vibration, and harshness (NVH)

issues during driving conditions, and/or to prevent fluids and/or debris from entering the area between the bottom of the bed cap and the top surface 26 of the bed well 18B.

Figure 15A:
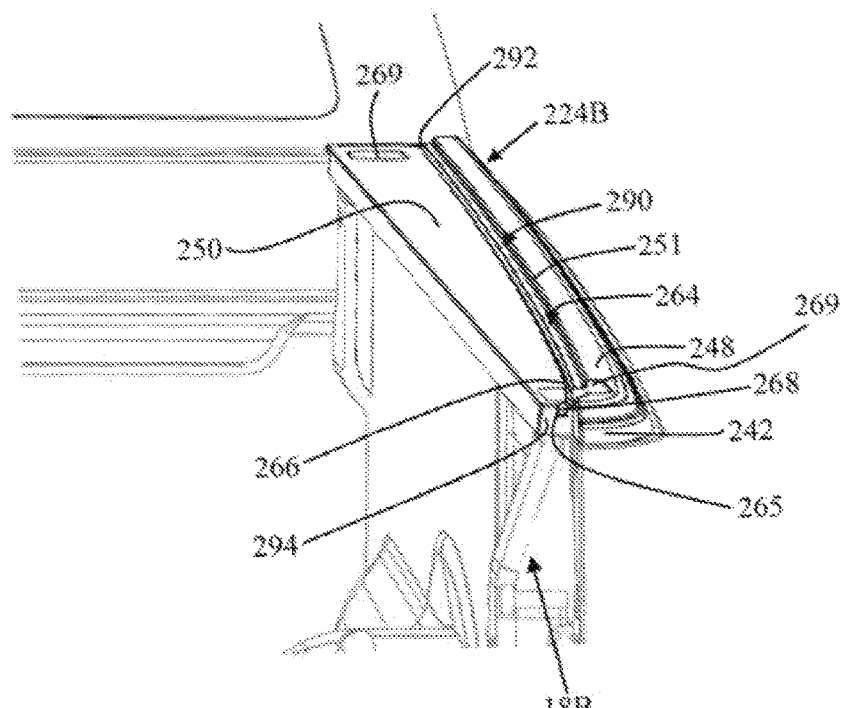
FIG. 15A is a perspective view of a bed cap assembly installed on a bed wall of the cargo area of a vehicle.
Figure 15B:
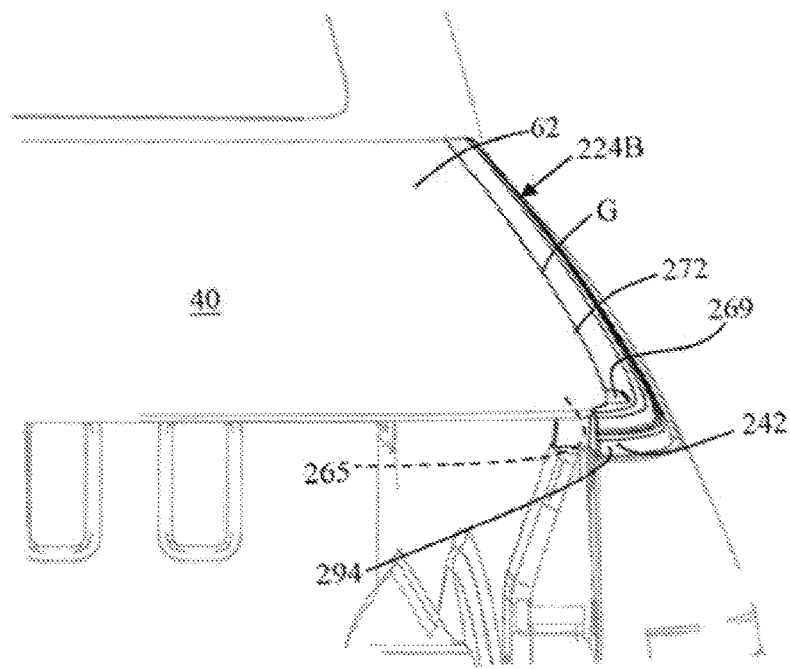
FIG. 15B is a perspective view of the bed cap assembly of FIG. 15A with a tonneau cover.

FIGS. 15A and 15B illustrate another bed cap assembly 224B. The bed cap assembly 224B is configured to be attached to the bed wall 18B of the vehicle 10 (i.e., passenger side). A similar bed cap assembly, or a mirror image of the bed cap assembly 224B may be configured to be attached to the bed wall 18A of the vehicle 10 (i.e., driver's side).

The bed cap 224B assembly comprises a bed cap 242. The bed cap 242 has upper and lower portions 248, 250 that are separated by an edge 251 that extends along a longitudinal length of the bed cap 242, from a forward-most end 292 to a rearward-most end 294 of the bed cap 242.

The bed cap assembly 224B comprises a fluid management system 290. The fluid management system 290 comprises a channel 264. The channel 264 is defined in the lower portion 250 of the bed cap 242. The channel 264 is defined by a floor 270 and opposing walls 266 and 268, like walls 66, 68 defined in other bed cap assemblies herein. The channel 264 has an open end 265 at the rearward-most end 294 of the bed cap 242. Fluid and/or debris inside of the channel 264 are configured to be drained or evacuated from the channel 264 through the open end 265. The channel 264 may also have an open end at the forward-most end 292 of the bed cap 242 for draining the fluids and/or debris from the channel 264. In some configurations, one or both of the ends 292, 294 may include a wall that is configured to prevent or restrict draining of fluid and/or debris, like in some of the configurations disclosed herein. The channel 264 may have openings in the floor 270 and walls 266, 268, like the openings 96, 104, 106 described above for draining or evacuating fluid and/or debris from the channel 264. Alternatively, the channel 264 may be free of any openings for draining or evacuating fluid and/or debris from the channel 264 and the fluid and/or debris may only be drained or evacuated from within the channel 264 via the open end of the channel 264 at the forward- and/or rearward-most ends of the channel.

The bed cap assembly 224B includes one or more stake hole openings 269 defined in the upper and/or lower portions 248, 250. The stake hole openings 269 provide access to the stake holes 114 defined in the top surface 26 of the bed wall 18B (FIGS. 9, 14A-B). The stake hole openings 269 may be exposed or accessible when the tonneau cover 40 is in an open position.

In FIG. 15B, the tonneau cover 40 in a closed position. In the closed position, the tonneau cover 40 may rest on the lower portion 250 of the bed cap 242 (FIG. 15A). A seal may be provided between the bottom surface of the tonneau cover 40 and the top surface of the lower portion 250, like the seal 46 and 146 illustrated and described above. The seal may be attached to bottom surface of the tonneau cover 40 and/or to the surface 250. In the closed position, an outboard lateral edge 272 of the tonneau cover 40 is located adjacent the edge 251 of the bed cap 242 such that there is a gap G defined therebetween. In the closed position, the channel 264 is covered by the tonneau cover 40 from above. In other configurations, the edge 272 of the tonneau cover 40 relative to the edge 251 and/or wall upper portion 248 may be like those illustrated and described above at FIGS. 3D-3F.

In the closed position, at least some of the stake hole openings 269 that were previously accessible in FIG. 15A are now hidden or concealed by the tonneau cover. However, in some configurations, some or all of the stake hole openings 269 may be open or accessible when the tonneau cover 40 is in a closed position. For example, in FIG. 15B the stake hole opening 269 located closest to the forward-most end 294 is at least partially open or accessible from the top.

When the tonneau cover 40 is in a closed position, fluid and/or debris that may flow or seep into the gap G between a lateral or output edge 272 of the tonneau cover 40 and the edge 251 of the bed cap 242 is guided into the channel 264, and then guided in a fore/aft direction along a length of the bed cap 242, for example between the forward and rearward ends 292, 294 of the bed cap 242. Advantageously the fluid and/or debris is maintained inside the channel 264 and prevented from flowing or passing into the cargo area 12. The fluid and/or debris are restricted or prevented from entering the cargo area 12 due to a fluid seal formed between the bottom surface of the tonneau cover 40 and the lower portion 250 of the bed cap 242 and/or due to a size or depth of the channel 264 where the fluid and/or debris are drained through the open end 265 or one or more ducts before the fluid and/or debris are accumulated enough to breach the height of wall 268 of the channel 264 to enter the cargo area 12.

When the tonneau cover 40 is in the closed position, a top surface 62 of the tonneau cover 40 may be generally flush with a top surface of the upper portion 248 of the bed cap 242. However, depending on the size or height of the edge 251, a thickness of the tonneau cover 40, and/or the relative position of the lower portion 250 relative to the top surface of the upper portion 248, the top surface 62 of the tonneau cover 40 may be generally lower or sub flush with the top surface of the upper portion 248 or generally higher or over flush with the top surface of the upper portion 248. A flush relationship between the top surface 62 of the tonneau cover 40 and the top surface of the upper portion 248 may provide a smooth look or improve aesthetics by providing what may appear to be a smooth or uniform tonneau cover assembly of the tonneau cover 62 and the bed cap assembly 224B.

Figure 16A:
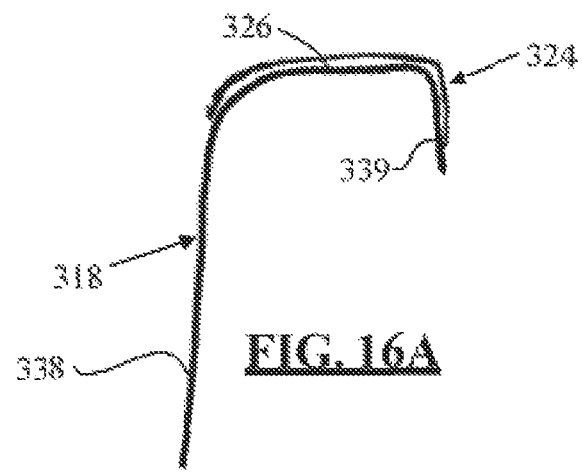
FIG. 16A is a cross-sectional view of a bed wall defining the cargo area in FIG. 1.

FIG. 16A is a schematic illustration of a bed wall 318 of the cargo area 12 of FIG. 1. The bed wall 318 can be any of the bed walls, including the tailgate 20, the front wall 16, and/or either or both of the side walls 18A, 18B. The bed wall 318 includes an outboard wall 338, a top surface 326, and an inboard wall 339. In vehicle position, the inboard wall 339 is located closer to an inside of the cargo area 12 (FIG. 1) vs. the outboard wall 338. The outboard wall 338 may be the outside wall 228 of the cargo area 12 or vehicle 10 that is visible to a person looking at the cargo area 12 or vehicle 10 from outside of the cargo area 12 or vehicle 10. A bed cap assembly 324, which may include one or more features of any of the bed cap assemblies described herein may be attached to or located on the top surface 326 of the bed wall 318.

Figure 16B:
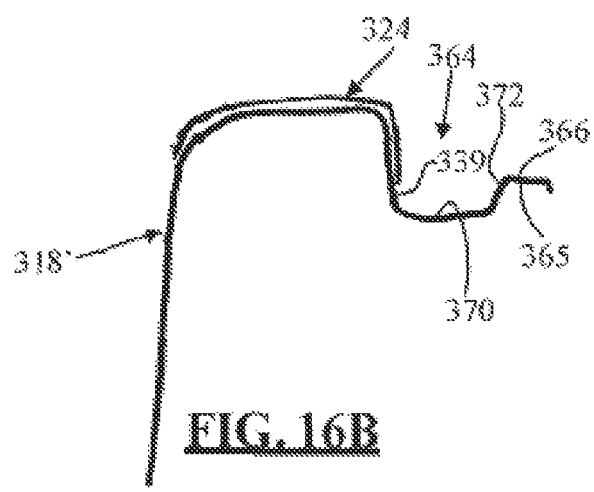
FIG. 16B is a cross-sectional view of a bed wall defining the cargo area in FIG. 1.
Figure 16C:
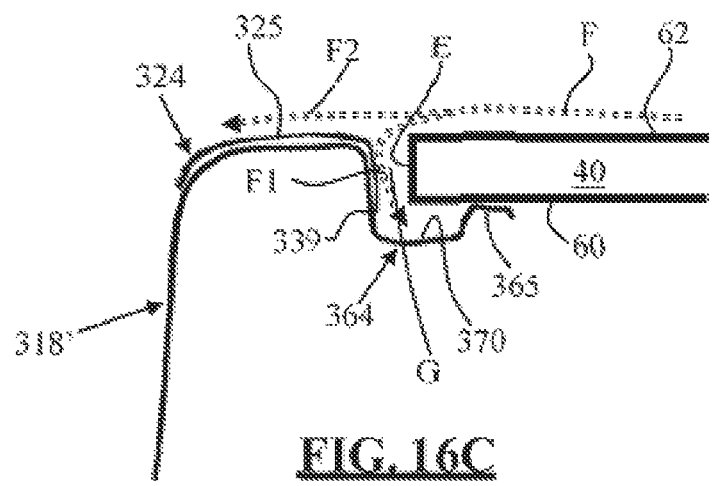
FIG. 16C is a cross-sectional view of a bed wall defining the cargo area in FIG. 1, illustrated with a portion of the tonneau cover.

In FIGS. 16B and 16C, the bed wall 318' includes a channel 364. The channel 364 may extend from the inboard wall 339 as an integrated component, or may be attached thereto with one or more fasteners. The inboard wall 339 may define one of the walls of the channel 354. The channel 364 includes a floor 370 and another wall 372 that is angled relative to the floor 370. The channel 364 may have structure and function like any of the channels of the water management system described herein, including having one or more openings, drains, ducts, and/or open ends (and/or closed ends) for evacuating fluid and/or debris from the channel 364. However, rather than routing or directing the fluid and/or debris into openings defined in the top surface of the bed wall, the fluid and/or debris may be directed into a side wall of the bed wall via one or more hoses, tubes, or ducts.

The bed wall 318' also includes a lower portion or flange or contact portion 365 that extends from wall 372 and is configured to contact and support a tonneau cover 40 when the tonneau cover 40 is in a closed position. A seal, like the seals 46, 146 described herein may be provided between the lower surface 60 of the tonneau cover 40 and a top surface 366 of the flange 365 to support the tonneau cover 40 and/or to provide a fluid seal to restrict or prevent fluid and/or debris from seeping or entering the cargo area 12 through gaps defined between the tonneau cover 40 and the top surface 366 flange 365.

When the tonneau cover 40 is in a closed position, a gap G may be defined between the edge E of the tonneau cover 40 and the inboard wall 339. The edge E may be a lateral edge of the tonneau cover if the bed wall 318' is a side wall of the cargo area 12, or the edge E may be a forward edge of the tonneau cover 40 if the bed wall 318' is a front wall of the cargo area 12, or the edge E may be a rear edge of the tonneau cover 40 if the bed wall 318' is a tailgate. In other configurations, the position of the edge E relative to the wall 339 and/or top surface 325 may be like those disclosed above at FIGS. 3D-3F.

When the vehicle 10 and/or tonneau cover 40 is exposed to fluid F, for example from a rain storm or car wash, the fluid F and/or other debris or fluids may flow or travel along the top surface 62 of the tonneau cover 40 towards the bed wall 318'. The fluid and/or debris may flow along a first flow path F1 into the gap G and then into the channel 364. The channel 364 is configured to collect the fluid and/or debris and prevent the fluid and/or debris from entering the cargo area 12. The fluid and/or debris from the first flow path F1 will be collected and maintained in the channel 364, between the first wall 339, the opposing wall 372, and the floor 370, and will be restricted or prevented from entering the cargo area 12. In order for the fluid to enter the cargo area 12 from the channel 370, the fluid would need to flow or seep into or between the bottom surface 60 of the tonneau cover 40 and the top or contact surface 366 of the flange 365. However, due to the weight of the tonneau cover 40 contacting the flange 365 and/or a seal therebetween, a fluid seal is maintained between the bottom surface 60 of the tonneau cover 40 and the flange 365.

The position of the flange 365 or contact surface 366 relative to the top surface 325 of the bed cap 324 and/or a thickness of the tonneau cover 40 is configured such that when the tonneau cover 40 is in a closed position like illustrated in FIG. 16C, the top surface 62 of the tonneau cover 40 is generally flush with the top surface 325 of the bed cap 324.

Figure 17:
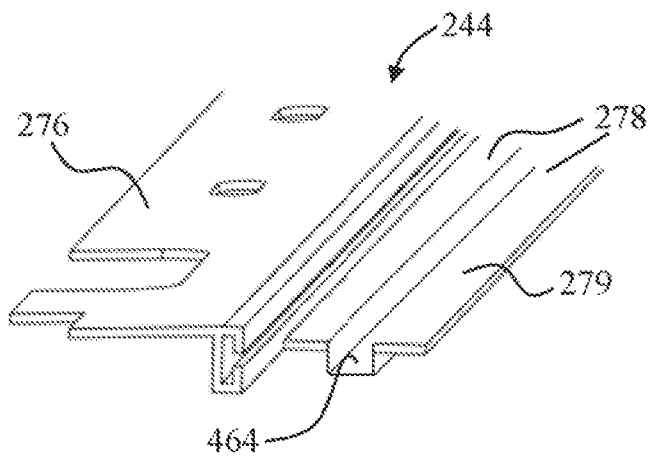
FIG. 17 is a perspective view of a support member for use with a bed cap assembly.

FIG. 17 illustrates a support member 244. The support member 244 may include many of the same elements and structure of any of the support members illustrated and described above, and may be used with any of the bed caps or bed cap assemblies disclosed herein.

The support member 244 includes a first support section 76 that may be sandwiched between a bed cap and a top surface of a bed wall defining the cargo area 12, or may be part of or integrally formed with the bed cap 42, as was described above at FIG. 3B. The support member 244 includes a second support section 278 that is configured to support a portion of a tonneau cover 40 when the cover 40 is in a lowered or closed configuration.

The second support section 278 includes a second channel 464 that may have structure and function like one or more of the channels disclosed herein. The second channel 464 may include one or more openings, drains, ducts, and/or open ends for evacuating fluid and/or debris from inside of the channel 464. The second channel 464 may serve as a backup channel to the channel defined in the bed cap so that any fluid and/or debris that may leak, seep, or spill out of the bed cap channel gets trapped in the second channel 464 of the support member. A seal, like the seals 46, 146 described herein may be provided between the inboard portion 270 of the second support section 278 and the bottom surface of the tonneau cover to support the tonneau cover 40 and/or to provide a fluid seal to restrict or prevent fluid and/or debris from seeping or entering the cargo area 12 through gaps defined between the tonneau cover 40 and the second support section 278.

Figure 18:
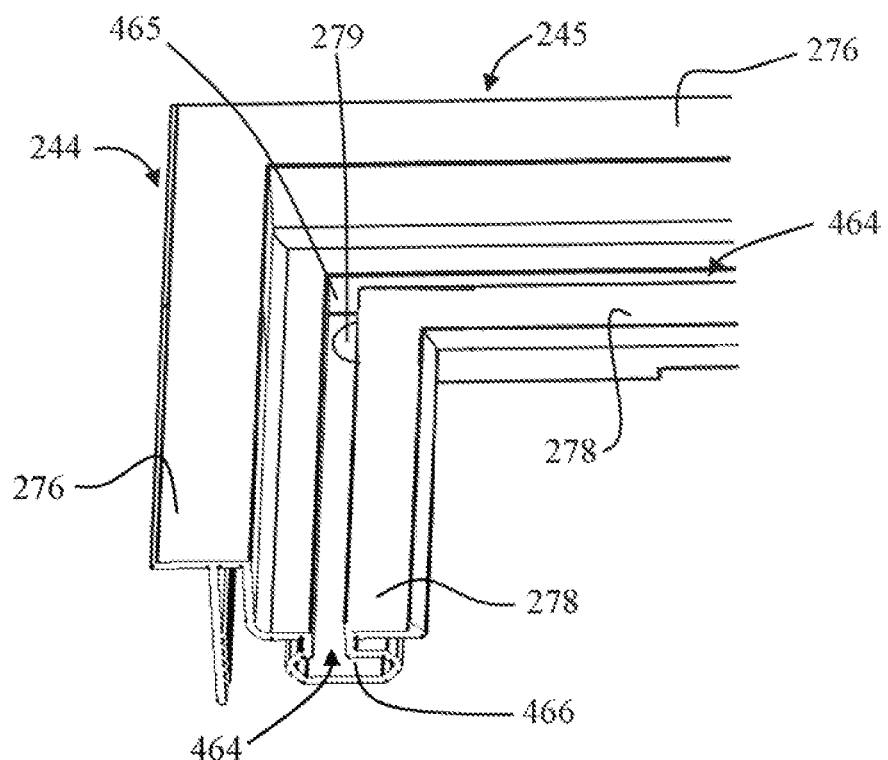
FIG. 18 is a top view of a support member for use with a bed cap assembly.

FIG. 18 illustrates two support members 244, 245. The support members 244, 245 are arranged at an angle relative to each other (i.e., generally perpendicular to each other). In vehicle position, the support members 244, 245 may be located at two adjacent or adjoining bed walls, such as, for example, at side wall 18A and front wall 16 and/or at side wall 18B and tailgate 20. Similar, but opposite or mirror image support members may be located at the other adjoining wall of the cargo area 12 (i.e., side wall 18A and tailgate 20 and side wall 18B and front wall 16; etc.).

The channels 464 of each support member 244, 245 are connected together at a corner 465 so that fluid and/or debris in channel 464 of support member 244 can be passed, flow, or be transferred into channel 464 of support member 245, and vice versa. A drain 279 is provided in the channel 464 that allows for the fluid and/or debris to be evacuated from inside the channels 464. The drain 279 may be located at a corner 465 or union between the two support members 244, 245, and/or anywhere in one or both of the channels 464. Via the drain 279, the fluid and/or debris may be passed into the open space or cavity defined between the inner and outer walls of the bed wall and then evacuated into the environment surrounding the vehicle 10. While the drain 279 is illustrated in the floor 466 of channels 464, the drain 279 or one or more other drains or fluid evacuating openings may be provided in the inboard and/or outboard walls defining the channel 464.

The first support sections 276 that may be sandwiched between a respective bed cap, for example, bed cap 24A and bed cap 32, and a top surface 26, 34 of a bed wall 18A, 16 defining the cargo area 12. Alternatively, one or both of the first support sections 276 may be part of or integrally formed with the bed cap 42, as was described above at FIG. 3B. The second support sections 278 are configured to support a portion of a tonneau cover 40 when the cover 40 is in a lowered or closed configuration.

Figure 19:
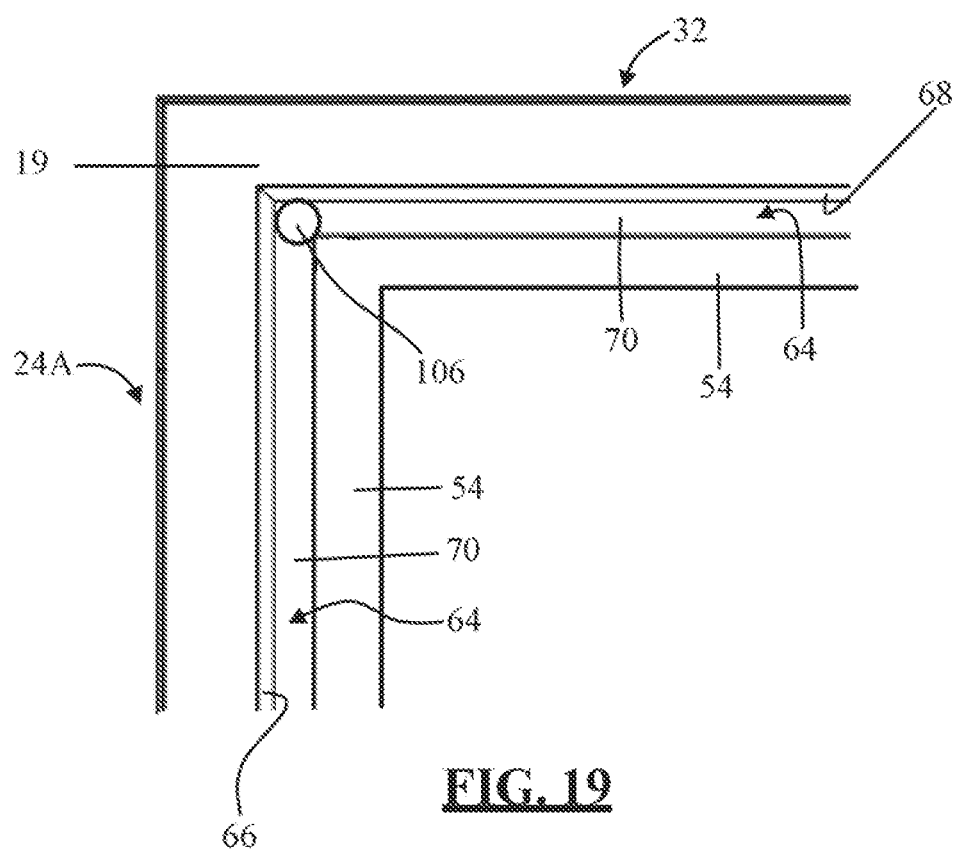
FIG. 19 is a top view of two bed cap assemblies.

FIG. 19 illustrates a schematic bed cap 18A and bed cap 32. The bed caps 18A, 32 are connected together with a connector or union 19, or the bed caps 18A, 32 may be integrally formed as an integral component. The union or connector 19 functions to connect the bed caps 18A, 32 together so that the respective channel 64 of each bed cap 18A, 32 is connected together so that fluid and/or debris in channel 64 of bed cap 18A can be passed into channel 64 of bed cap 32, and vice versa. This may advantageously allow for fluid and/or debris to be routed via the channels 64 to a location in the channel 64 where a drain or opening is located for evacuating the fluid and/or debris from the channel 64 to a location outside of the cargo area 12 and/or vehicle 10. For example, the fluid and/or debris may be evacuated via a floor opening 106 that is located at the corner where the two channels 64 are joined together. Additionally, or alternatively, a wall opening may be defined in wall 66 and/or the opposing wall (i.e., wall 68 in FIG. 3A) defining the channel 64 for evacuating the fluid and/or debris from the channel. The bed caps 24A, 32 have a ledge 54 that may or may not include a seal, like seal 46, for a tonneau cover 40 to contact when in the closed position. The bed caps 24A, 32 may or may not include a support member (like support member 44, for example) and/or supporting sections 76, 78, for example.

Figure 20:
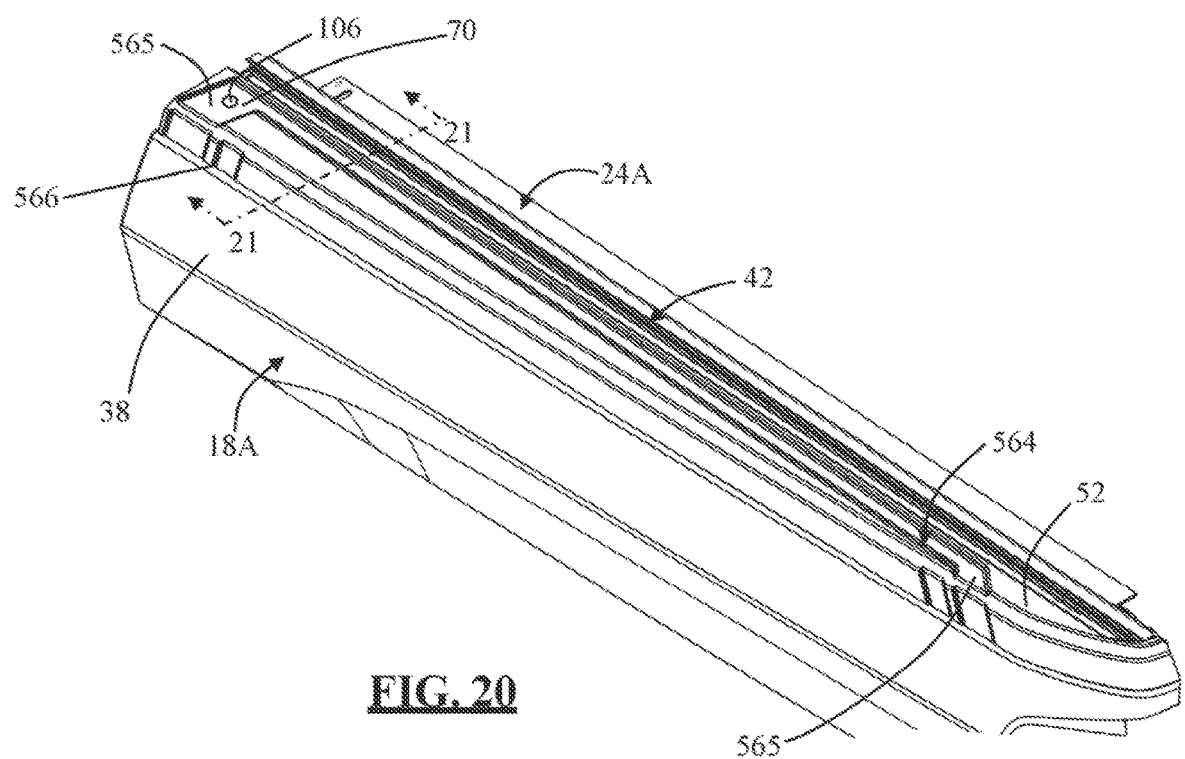
FIG. 20 is a perspective view of a bed cap installed on a portion of a bed wall.

FIG. 20 illustrates bed cap assembly 24A installed on wall 18A. The bed cap 42 comprises a channel 564 defined in the top surface 52 of the bed cap 42. The channel 564 may function like any of the other channels disclosed herein to capture, contain, and direct fluids and/or debris away from the inside of the cargo area 12 of the vehicle 10 (FIG. 1). The channel 564 has a generally C-shape, and is defined by walls that extend at least partially along the length of the bed cap 42. The channel 564 includes drains at 565 that provide for the fluid and/or debris to be evacuated from inside the channel 564 to outside of the cargo box 12 for example along the outside wall 38 of the bed wall 18A. The floor 70 of the channel 564 may optionally include one or more floor drains 106 for evacuating the fluid and/or debris from the channel 564, for example, via one or more downspouts or hoses to an area between the inner and outer walls defining the bed wall 18A. Additionally, the channel 564 may include one or more wall openings that are provided in walls of the channel 564 that are generally perpendicular to the floor 70 for evacuating the fluid and/or debris from inside the channel 564. The walls of the channel 564 may be drafted, angled, or sloped to allow for manufacturing of the bed cap 42 and/or for the fluid and/or debris to flow into the channel 564. The channel 564 may also function as a styling or aesthetic groove of the bed cap assembly 24A.

One or more gaps, openings, and/or weep ports 566, may be defined between an outer edge or perimeter of the bed cap 42 (See edge 103 at FIG. 6, for example) and the outside wall 38 of the bed wall 18A, which may provide a location for fluids and/or debris to be evacuated from the bed cap assembly 24A to environment surrounding the cargo area 12. The fluid and/or debris may be transported via one or more hoses, tubes, conduits, or passageways under the top surface 52 of the bed cap 42, as discussed further with reference to FIG. 21.

Figure 21:
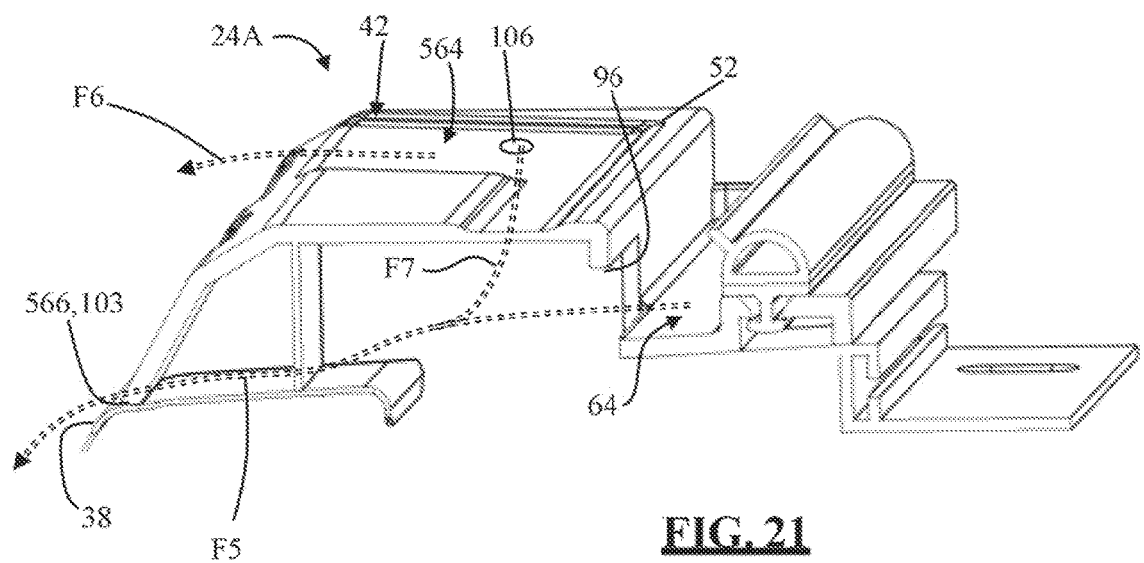
FIG. 21 is a cross-sectional view of the bed cap of FIG. 20 taken along line 21-21.

FIG. 21 illustrates a section of the bed cap assembly 24A taken along line 21-21 in FIG. 20. Fluid and/or debris from inside the channel 64 may be directed into the wall opening 96, and then rather than being directed into an opening defined in the top surface 26 of the wall defining the cargo area 12 like was previously discussed, the fluid and/or debris may travel along a flow path F5 under the bed cap 42 to the gap 566 defined between the edge or perimeter 103 of the bed cap 42 (see also FIG. 6) and the outside wall 38 for evacuation to the environment surrounding the cargo area 12.

Fluid and/or debris located in the channel 564 defined on the top surface 52 of the bed cap 42 may be evacuated from the channel 564 along flow path F6 via drain 565. If the bed cap 42 includes a floor drain 106 in channel 564, the fluid and/or debris may drain into the floor drain 106 and then be directed along flow path F7 under the bed cap 42 to the gap 566 defined between the edge or perimeter 103 of the bed cap 42 (see also FIG. 6) and the outside wall 38 for evacuation to the environment surrounding the cargo area 12. The configuration in FIG. 21 may be desirable for use with a bed wall that does not any openings defined in the top surface thereof. In such a configuration, the bed cap assembly 24 may be attached via one or more adhesives or glues to the top surface of the bed wall. The fluid paths F5 and F7 may be guided via one or more hoses, ducts, or tubes from the opening 96, 106 to the gap 566 for evacuation of the fluid and/or debris to an area outside of the cargo area 12 of the vehicle 10.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

The invention claimed is:

1. A bed cap configured for attachment to a tailgate of a vehicle, the bed cap comprising:
   a channel configured to collect fluid and/or debris, the channel comprising a first opening for evacuating the fluid and/or debris from within the channel, wherein the bed cap is configured for attachment to the tailgate so that during movement of the tailgate, the bed cap moves with the tailgate, wherein the bed cap comprises one or more fasteners for engaging a top surface of the tailgate.

2. The bed cap according to claim 1, wherein the channel extends along a longitudinal axis, the bed cap comprises an end wall at an end of the longitudinal axis, the first opening is defined through the end wall.

3. The bed cap according to claim 2, wherein the bed cap is configured to cover the top surface of the tailgate, and in vehicle position the channel extends in a cross-car direction.

4. The bed cap according to claim 3, wherein in the vehicle position, the end wall and the first opening are located at a driver side of the vehicle.

5. The bed cap according to claim 3, wherein the bed cap comprises a seal, wherein a tonneau cover is configured to engage the seal when the tonneau cover is in a closed position.

6. The bed cap according to claim 5, wherein in the vehicle position, the seal is arranged forward of the channel.

7. The bed cap according to claim 6, wherein the seal extends along an axis that is generally parallel to the longitudinal axis of the channel.

8. The bed cap according to claim 7, wherein the bed cap comprises a ledge and the seal is located on the ledge.

9. The bed cap according to claim 2, wherein the bed cap comprises a second end wall at an opposing end of the longitudinal axis, the second end wall opposes the end wall, the second end wall is free of any openings.

10. The bed cap according to claim 2, wherein the bed cap comprises a second end wall at an opposing end of the longitudinal axis, the second end wall opposes the end wall, the second end wall comprises a second opening for evacuating the fluid and/or debris from within the channel.

11. The bed cap according to claim 1, wherein in vehicle position the channel is arranged on top of the top surface of the tailgate.

12. The bed cap according to claim 1, wherein the channel comprises a floor, a front wall, a first back wall arranged generally parallel to the front wall, and a second back wall arranged at an angle to the first back wall, the first back wall connects the first back wall to the floor.

13. The bed cap according to claim 12, wherein the second back wall is sloped between the first back wall and the floor.

14. The bed cap according to claim 1, wherein the channel comprises a U-shaped cross section or a V-shaped cross section.

15. The bed cap according to claim 1, wherein the bed cap comprises a support member between the bed cap and the top surface of the tailgate.

16. The bed cap according to claim 1, wherein the bed cap is attached to and/or in contact with: the top surface of the tailgate, an inside surface of the tailgate, an outside surface of the tailgate, or a combination thereof.

17. The bed cap according to claim 1, wherein the bed cap comprises one or more fasteners for attaching the bed cap to the tailgate.

18. A bed cap configured for attachment to a tailgate of a vehicle using one or more fasteners, the bed cap comprising:

a channel configured to collect fluid and/or debris, the channel extends along a longitudinal axis, the bed cap comprises a first end wall at one end of the channel and a second end wall at an opposite end of the channel, wherein one or both of the first end wall and the second end wall comprises an opening for evacuating the fluid and/or debris from within the channel, the bed cap is configured to cover a top surface of the tailgate, and in vehicle position the longitudinal axis extends in a cross-car direction, wherein the one or more fasteners engage the top surface of the tailgate.

19. The bed cap according to claim 18, wherein the bed cap comprises a ledge and a seal located on the ledge, wherein in vehicle position the seal is located forward of the channel.

20. The bed cap according to claim 18, wherein in vehicle position the channel is arranged on top of the top surface of the tailgate.

21. The bed cap according to claim 18, wherein the bed cap is attached to and/or in contact with: the top surface of the tailgate, an inside surface of the tailgate, an outside surface of the tailgate, or a combination thereof.

22. A bed cap configured for attachment to a tailgate of a vehicle, the bed cap comprising:

a channel configured to collect fluid and/or debris, the channel comprising a first opening for evacuating the fluid and/or debris from within the channel, wherein the channel extends along a longitudinal axis, the bed cap comprises an end wall at an end of the longitudinal axis, the first opening is defined through the end wall, and wherein the bed cap comprises a second end wall at an opposing end of the axis, the second end wall opposes the end wall, the second end wall is free of any openings.

23. The bed cap according to claim 22, wherein the bed cap comprises at least one configuration selected from a group comprising:

i. in vehicle position, the channel is arranged on top of a top surface of the tailgate;

ii. the bed cap is attached to and/or in contact with: the top surface of the tailgate, an inside surface of the tailgate, an outside surface of the tailgate, or a combination thereof;

iii. the bed cap comprises one or more fasteners for attaching the bed cap to the tailgate;

iv. the bed cap comprises one or more fasteners for attaching the bed cap to the top surface of the tailgate;

v. the bed cap is configured for attachment to the tailgate so that during movement of the tailgate, the bed cap moves with the tailgate;

vi. the bed cap comprises a seal, wherein a tonneau cover is configured to engage the seal when the tonneau cover is in a closed position; and vii. the bed cap comprises a support member between the bed cap and the top surface of the tailgate.

* * * * *